US011695586B2

United States Patent
Kim et al.

(10) Patent No.: US 11,695,586 B2
(45) Date of Patent: *Jul. 4, 2023

(54) SMART HOME CONTROLLER REFRIGERATOR AND CONTROL METHOD THEREFOR

(71) Applicant: LG ELECTRONICS INC., Seoul (KR)

(72) Inventors: Sang Oh Kim, Seoul (KR); Jungsang Yun, Seoul (KR); Dul Lae Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

This patent is subject to a terminal disclaimer.

(21) Appl. No.: 17/392,543

(22) Filed: Aug. 3, 2021

(65) Prior Publication Data

US 2021/0364227 A1    Nov. 25, 2021

Related U.S. Application Data

(63) Continuation of application No. 16/305,216, filed as application No. PCT/KR2017/005914 on Jun. 7, 2017, now Pat. No. 11,112,169.

(30) Foreign Application Priority Data

Jun. 9, 2016    (KR) ........................ 10-2016-0071853

(51) Int. Cl.
*G05B 15/02*    (2006.01)
*H04L 12/28*    (2006.01)
(Continued)

(52) U.S. Cl.
CPC .......... *H04L 12/2818* (2013.01); *F24F 11/62* (2018.01); *F25D 23/028* (2013.01);
(Continued)

(58) Field of Classification Search
CPC ................... H02J 3/14; H04L 12/2803; H04L 2012/2841; H04L 2012/285;
(Continued)

(56) References Cited

U.S. PATENT DOCUMENTS 8,220,279 B2    7/2012    Do
2002/0029575 A1    3/2002    Okamoto
(Continued)

FOREIGN PATENT DOCUMENTS

CN    1570929    1/2005
JP    2002-092306    3/2002
(Continued)

OTHER PUBLICATIONS

KR 100756358, "Home Network System Using Bluetooth and Method Thereof" (translation), Sep. 10, 2007, 11 pgs <KR_100756358.pdf>.*

(Continued)

*Primary Examiner* — Tuan A Vu
(74) *Attorney, Agent, or Firm* — Ked & Associates LLP

(57) ABSTRACT

The present invention relates to a smart home controller refrigerator and a control method therefor, the smart home controller refrigerator, according to one embodiment of the present invention, comprising: a control unit comprising a control protocol communication unit for receiving control information for controlling a home appliance in a home, an operation protocol communication unit for generating an operation signal calculated from the control information, and a signal transmission unit for transmitting the operation signal to the home appliance; at least one storage space; and at least one door for controlling the opening/closing of the at least one storage space.

20 Claims, 17 Drawing Sheets

(51) Int. Cl.
  *F25D 29/00*   (2006.01)
  *G05B 19/042*  (2006.01)
  *F24F 11/62*   (2018.01)
  *F25D 23/02*   (2006.01)
  *H04N 21/422*  (2011.01)
  *G06F 1/3234*  (2019.01)

(52) U.S. Cl.
  CPC ........... *F25D 29/00* (2013.01); *G05B 19/042* (2013.01); *H04L 12/2803* (2013.01); *F25B 2600/07* (2013.01); *G05B 15/02* (2013.01); *G05B 2219/2642* (2013.01); *G05B 2219/2654* (2013.01); *G06F 1/3262* (2013.01); *H04L 12/2832* (2013.01); *H04L 2012/285* (2013.01); *H04L 2012/2841* (2013.01); *H04N 21/42224* (2013.01)

(58) Field of Classification Search
  CPC .. H04L 12/2818; F25D 29/00; F25B 2600/07; G05B 19/042; G05B 2219/2654
  See application file for complete search history.

(56) References Cited

U.S. PATENT DOCUMENTS

| | | | |
|---|---|---|---|
| 2009/0090127 A1 | 4/2009 | Do | |
| 2011/0144778 A1 | 6/2011 | Fung | |
| 2011/0175742 A1* | 7/2011 | Shin | F25D 29/00 700/282 |
| 2011/0196547 A1* | 8/2011 | Park | H02J 3/14 700/296 |
| 2012/0105424 A1 | 5/2012 | Lee et al. | |
| 2012/0169667 A1 | 7/2012 | Lu | |
| 2012/0215370 A1* | 8/2012 | Seo | H04L 12/2803 700/296 |
| 2014/0121786 A1 | 5/2014 | Chen | |
| 2015/0219352 A1 | 8/2015 | Kobayashi | |
| 2016/0149716 A1 | 5/2016 | Raj | |
| 2016/0202786 A1 | 7/2016 | Lee et al. | |
| 2016/0218884 A1 | 7/2016 | Ebrom | |
| 2016/0379481 A1 | 12/2016 | Kim | |
| 2019/0042015 A1 | 2/2019 | Lee et al. | |
| 2020/0081564 A1 | 3/2020 | Lee et al. | |
| 2021/0181869 A1 | 6/2021 | Lee et al. | |
| 2022/0147168 A1 | 5/2022 | Lee et al. | |

FOREIGN PATENT DOCUMENTS

| | | |
|---|---|---|
| JP | 2003-345689 | 12/2003 |
| KR | 10-2002-0020831 | 3/2002 |
| KR | 10-2002-0030222 | 4/2002 |
| KR | 10-2002-0045057 | 6/2002 |
| KR | 10-2004-0045656 | 6/2004 |
| KR | 10-2004-0049665 | 6/2004 |
| KR | 10-2008-0035098 | 4/2008 |
| KR | 10-0880486 | 1/2009 |
| KR | 10-2009-0012693 | 2/2009 |
| KR | 10-2009-0076555 | 7/2009 |
| KR | 10-2012-0044874 | 5/2012 |
| KR | 10-2013-0121533 | 11/2013 |
| KR | 10-2015-0016428 | 2/2015 |

OTHER PUBLICATIONS

International Search Report dated Sep. 18, 2017 issued in Application No. PCT/KR2017/005914.
European Search Report dated Dec. 5, 2019 issued in Application No. 17810541.7.
United States Office Action dated Mar. 1, 2021 issued in U.S. Appl. No. 16/305,216.
Korean Office Action dated Jun. 22, 2022 issued in Application No. 10-2016-0071853.
Korean Notice of Allowance dated Oct. 4, 2022 issued in KR Application No. 10-2016-0071853.

* cited by examiner

FIG. 5
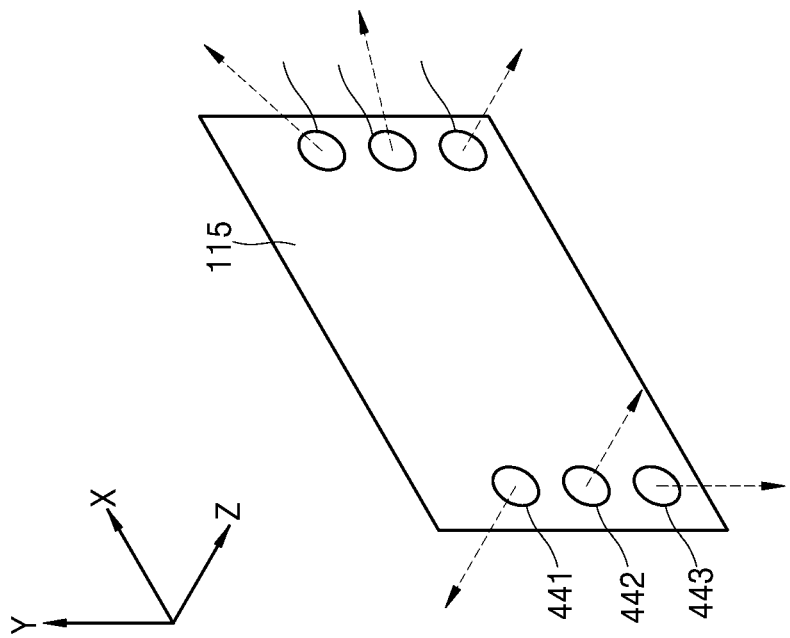
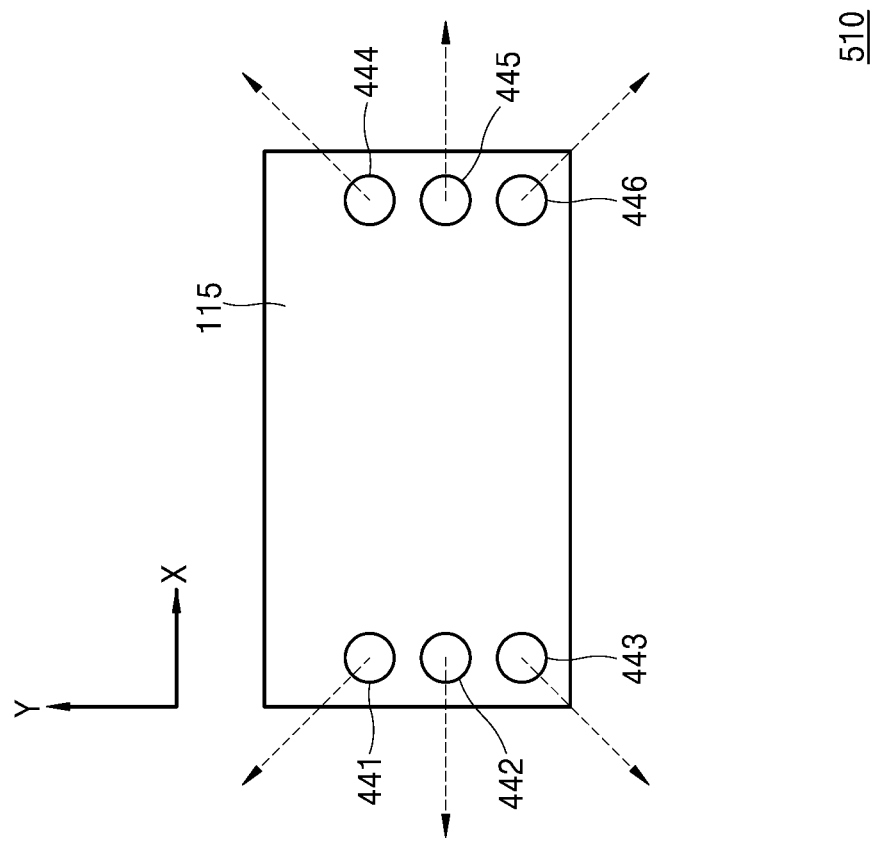

| | |
|---|---|
| 9:00 A.M.<br>12:00 P.M. | THE LIVING ROOM AIR CONDITIONER ON 24DEGREES<br>NOW |
| 1:00 P.M.<br>2:00 P.M. | THE LIVING ROOM LAMP ON<br>AFTER 4 HOURS |
| 5:00 P.M.<br>6:00 P.M. | THE AIR PURIFIER ON<br>AFTER 8 HOURS |
| 7:00 P.M.<br>11:00 P.M. | ALL LAMP ON<br>AFTER 10 HOURS |
| 9:00 P.M.<br>10:00 P.M. | TV ON CHANNEL MBC<br>AFTER 12 HOURS |
| 10:00 P.M. | THE MAIN ROOM AIR CONDITIONER ON 21 DEGREES<br>AFTER 13 HOURS |

1010

| Serial | Time | Protocol | ID | Info | Signal 1 | Signal 2 | Signal 3 | Duration | Result |
|---|---|---|---|---|---|---|---|---|---|
| 1951 | 2016-03-05 9:00 | IR | Aircon_1 | IR_ID1 | ON | Temp_24 | | 3:00 | |
| 1952 | 2016-03-05 13:00 | IR | Lamp_1 | IR_ID2 | ON | | | 1:00 | |
| 1953 | 2016-03-05 17:00 | Zigbee | AirPurifer_1 | Zigbee_1 | ON | | | 1:00 | |
| 1954 | 2016-03-05 19:00 | IR, Bluetooth | ALL_Lamp | | ON | | | 4:00 | |
| 1955 | 2016-03-05 21:00 | IR | TV_1 | IR_ID9 | ON | CH_11 | | 1:00 | |
| 1956 | 2016-03-05 22:00 | Bluetooth | Aircon_2 | BT_1 | ON | Temp_21 | | | |

| Serial | Time | Protocol | ID | Info | Signal 1 | Signal 2 | Signal 3 | Duration | Result |
|---|---|---|---|---|---|---|---|---|---|
| 1951 | 2016-03-05 9:00 | IR | Aircon_1 | IR_ID1 | ON | Temp_24 | | 3:00 | OK |
| 1952 | 2016-03-05 13:00 | IR | Lamp_1 | IR_ID2 | ON | | | 1:00 | OK |
| 1953 | 2016-03-05 17:00 | Zigbee | AirPurifier_1 | Zigbee_1 | ON | | | 1:00 | NOT_CONNECTED |
| 1954 | 2016-03-05 19:00 | IR, Bluetooth | ALL_Lamp | | ON | | | 4:00 | FAIL_SHUTDOWN |
| 1955 | 2016-03-05 21:00 | IR | TV_1 | IR_ID9 | ON | CH_11 | | 1:00 | OK |
| 1956 | 2016-03-05 22:00 | Bluetooth | Aircon_2 | BT_1 | ON | Temp_21 | | 1:00 | OK |

1101

| | | |
|---|---|---|
| 9:00 A.M.<br>12:00 P.M. | THE LIVING ROOM AIR CONDITIONER ON 24 DEGREES | COMPLETED |
| 1:00 P.M.<br>2:00 P.M. | THE LIVING ROOM LAMP ON | COMPLETED |
| 5:00 P.M.<br>6:00 P.M. | THE AIR PURIFIER ON | CONNECTION FAILURE |
| 7:00 P.M.<br>11:00 P.M. | ALL LAMP ON | POWER FAILURE |
| 9:00 P.M.<br>10:00 P.M. | TV ON CHANNEL MBC | COMPLETED |
| 10:00 P.M. | THE MAIN ROOM AIR CONDITIONER ON 21 DEGREES | COMPLETED |

SMART HOME CONTROLLER REFRIGERATOR AND CONTROL METHOD THEREFOR

CROSS-REFERENCE TO RELATED PATENT APPLICATIONS

This application is a Continuation Application of U.S. application Ser. No. 16/305,216, filed Nov. 28, 2018, which is a U.S. National Stage Application under 35 U.S.C. § 371 of PCT Application No. PCT/KR2017/005914, filed Jun. 7, 2017, which claims priority to Korean Patent Application No. 10-2016-0071853, filed Jun. 9, 2016, whose entire disclosures are hereby incorporated by reference.

TECHNICAL FIELD

This application is a technology with regard to a smart home controller refrigerator and a method that controls the same.

BACKGROUND ART

A refrigerator, which is a device for maintaining a temperature of various kinds of stored goods at a low temperature or cooling it, includes a storage compartment formed with one or more separated spaces. The refrigerator has a temperature change section that can be maintained at a maximum in a product production and shipment process, and in this section, a user can adjust a temperature of the refrigerator to set the refrigerator so that a specific control temperature is maintained.

On the other hand, the refrigerator is a configuration in which a power supply is always connected in order to maintain an internal temperature. Unlike a general home appliance, a state in which a power supply is supplied is continuously maintained. Therefore, the home appliance such as the refrigerator has an ensured stability of a supply of a power supply compared to other home appliances, and has a property of not being easily turned off or rebooted by the user compared to other home appliances.

Accordingly, when the refrigerator operates as a smart home controller that controls the home appliance in consideration of the property of a power supply use of the refrigerator and an area where the refrigerator is arranged, it is possible to control other home appliances stably in terms of a supply of the power supply. However, until now, the refrigerator has focused on a refrigeration or freezing function, and since it is relatively excluded from a process of building a smart home, there have been many limitations in controlling the smart home using a refrigerator.

DISCLOSURE

Technical Problem

In order to solve the above-mentioned problem, this application provides a smart home controller refrigerator and a method of controlling the same based on a power supply stability that a refrigerator has and an openness of an arrangement location that a refrigerator has.

The present specification provides a method of controlling a home appliance in home everywhere through a refrigerator by transmitting an operation signal of a remote control that controls a home appliance in home to a home appliance by a refrigerator, and a refrigerator that implements the same.

In the present specification, the refrigerator controls the home appliances with a smart home controller instead of various remote controls of the home appliances, and uses a portable device to control the refrigerator.

The objects of this application are not limited to the above-mentioned objects, and the other objects and advantages of this application which are not mentioned can be understood by the following description, and more clearly understood by the embodiment of this application. It will also be easily seen that the objects and advantages of this application may be realized by means indicated in the patent claims and a combination thereof.

Technical Solution

A smart home controller refrigerator according to an exemplary embodiment of this application may include a control unit including a control protocol communication unit that receives control information that controls a home appliance in home; an operation protocol communication unit that generates an operation signal calculated from the control information; and a signal transmitting unit that transmits the above-mentioned operation signal to the home appliance; one or more storage spaces; and one or more doors that control an opening and a closing of the storage space.

A method for controlling a smart home controller refrigerator according to another embodiment of this application may include transmitting control information that controls a generation of an operation signal necessary for operating a home appliance in home in accordance with a control protocol to a control unit of a refrigerator or an external server by a portable device; and receiving control result information including a result that generates and transmits an operation signal corresponding to the control information from the control unit of the refrigerator or the external server by using the control protocol by the portable device.

A method for controlling a smart home controller refrigerator according to still another embodiment of this application may include controlling a control protocol communication unit to receive the control information that controls a generation of an operation signal necessary for operating a home appliance in home from an external server or a portable device by the control unit; controlling an operation protocol communication unit to generate the operation signal calculated from the control information by the control unit; and transmitting the operation signal to the home appliance by a signal transmitting unit by a control of the control unit.

Advantageous Effects

When applying this application, it is possible to control a home appliance based on an openness of arrangement of a refrigerator in which a power supply is stably supplied.

In addition, when applying this application, control information set in a portable device such as a smart phone may be transmitted to a home appliance as an operating signal through a refrigerator, which is a smart home control unit, so that it is possible to provide a method that controls a home appliance in home everywhere and a refrigerator that implements the same.

Further, when applying this application, the refrigerator can control home appliances with a smart home control unit instead of various remote controls of the home appliances, and use a portable device such as a smart phone to control the refrigerator, thereby increasing a convenience of a control.

An effect of this application is not limited to the effect mentioned above, and those skilled in the art of this application can easily derive various effects of this application in a constitution of this application.

DESCRIPTION OF DRAWINGS

FIG. 5 is a view showing a signal transmission direction of the infrared light emitting units according to an exemplary embodiment of this application.

FIG. 10 is a view showing a screen for controlling a home appliance in a portable device according to an exemplary embodiment of this application and information stored in a storage unit of the refrigerator.

FIG. 11 is a view showing control result information according to an embodiment of this application displayed on a portable device.

BEST MODE

Figure 1:
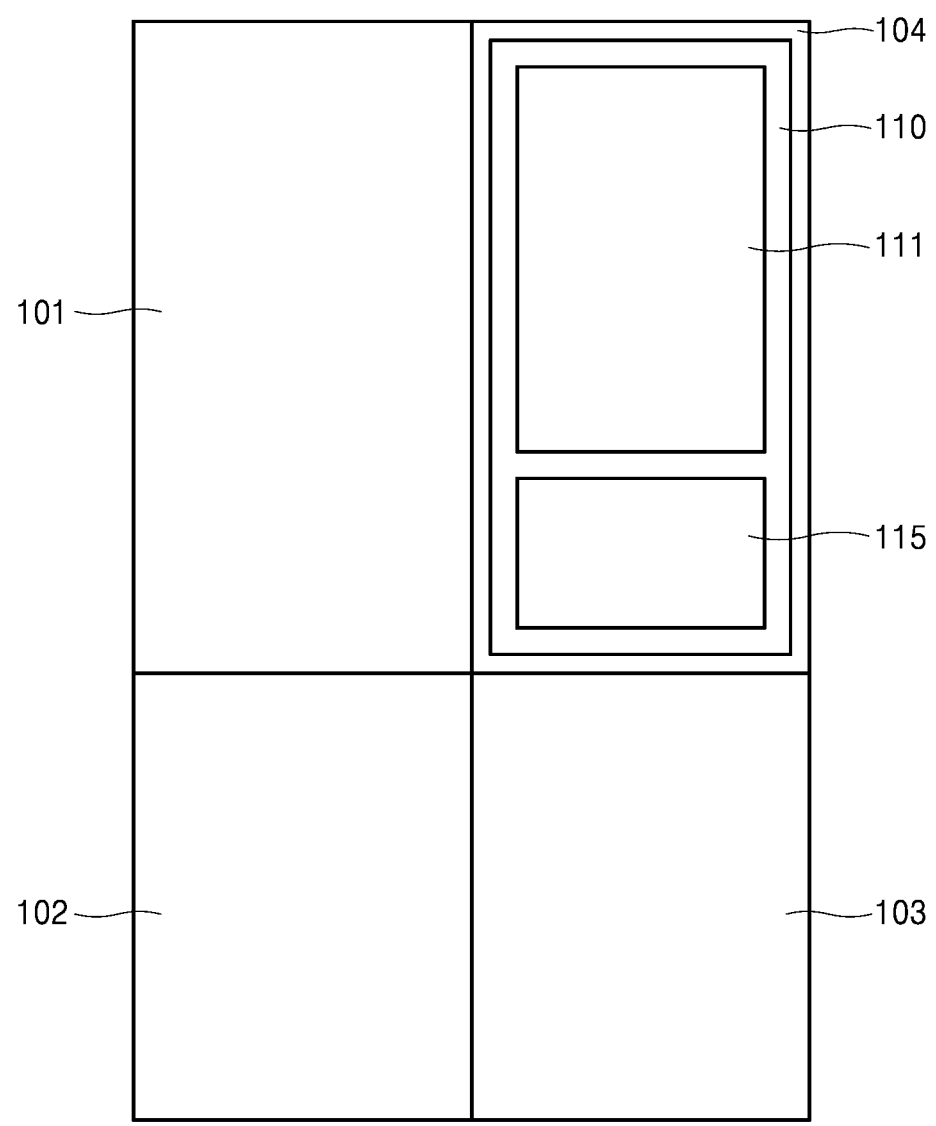
FIG. 1 is a view showing a smart home controller refrigerator to which an embodiment of this application is applied.

Hereinafter, the embodiment of this application will be described in detail with reference to the drawings so that those skilled in the art to which this application pertains can easily perform this application. This application can be implemented in many different forms and is not limited to the embodiment described herein.

In order to clearly illustrate this application, a part that is not related to the description is omitted, and the same or similar components are denoted by the same reference numerals throughout the specification. Further, some embodiments of this application will be described in detail with reference to exemplary drawings. In adding the reference numerals to the components of each drawing, the same components may have the same sign as possible even if they are displayed on different drawings. Further, in describing this application, when it is determined that a detailed description of a related known configuration and a function may obscure the gist of this application, the detailed description thereof will be omitted.

In describing the component of this application, it is possible to use the terms such as first, second, A, B, (a), (b), etc. These terms are only intended to distinguish a component from another component, and a nature, an order, a sequence, or the number of the corresponding components are not limited by that term. When a component is described as being "connected", "coupled", or "connected" to another component, the component may be directly connected or connected to another component, it is to be understood that another component is "interposed" between each component, or each component is "connected", "coupled", or "connected" through another component.

Further, in implementing this application, for convenience of explanation, the component will be described by being subdivided; however, these components may be implemented in a device or a module, or a component may be implemented by being divided into a plurality of devices or modules.

In the present specification, as a device for a refrigeration or a freezing of stored goods, a refrigerator will be mainly described, and may include all the devices that mainly do various refrigerating and freezing functions, for example, a refrigerator that stores general food, a kimchi refrigerator, a beverage refrigerator, a household refrigerator, a commercial refrigerator, and a freezing device made of only a freezer. In addition, the devices that refrigerate stored goods, not the food, such as a cosmetic refrigerator may be included in an embodiment that is mentioned in the present specification.

FIG. 1 is a view showing a smart home controller refrigerator to which an embodiment of this application is applied. FIG. 1 shows an appearance in a state in which a refrigerator 100 is closed. The refrigerator 100 may include a plurality of doors 101, 102, 103 and 104, and each of the doors 101, 102, 103 and 104 may control an opening and a closing of an independent freezing or refrigeration storage space.

On the other hand, an interface unit such as 110 may be arranged to set and control a function of the refrigerator. The interface unit may be arranged with a display unit 111 that outputs various images, and a touch unit 115 that receives an input from an outside and provides a signal that senses the input from the outside. In an embodiment, the display unit 111 and the touch unit 115 may be seamlessly arranged, and the touch unit 115 may include a light emitting unit that emits a light by an LED that uses an infrared ray and a light receiving unit that receives the light-emitted signal herein.

An LED infrared signal emitted from the light emitting unit may be received in the light receiving unit, and as a result, a touch of a user can be sensed in the refrigerator 100. Further, it is possible to receive a touch input from the entire display unit 111 by coupling an infrared ray sensing function to an outside of the display unit 111. The display unit 111 may be formed to identify an inside of a storage space by using a transparent display panel.

In this specification, in order for the refrigerator 100 to provide a function of a smart home control unit, a configuration of communicating with a smart phone, a tablet, a computer, or an external server, etc., with a control protocol to receive control information necessary for controlling the home appliances in home and communicating with an operation protocol to the home appliances again and a method of implementing the same will be described. As the control protocol, a wireless LAN communication protocol such as Wi-Fi (802.11), a communication protocol such as mobile communication such as 4G/5G, and a wire LAN communication protocol such as TCP/IP, etc., may be used. Further, the operation protocol may be a short distance communication protocol, etc., such as Infra Red, Bluetooth, ZigBee, Ultra Wide Band (UWB). In an embodiment, a Radio Frequency (RF) communication may be used as an operation protocol.

A control protocol may be relatively complicated and may use a communication protocol suitable for processing a large amount of data. On the other hand, the operation protocol may be simple and can use a protocol suitable for processing a small amount of data. In addition, the operation protocol may be implemented by using the sensors arranged in an interface unit 110 of a refrigerator 100. In order to increase an efficiency of a propagation in home of the signal that the above-mentioned sensors of the refrigerator 100 transmit, a separate relay may be included.

Figure 2:
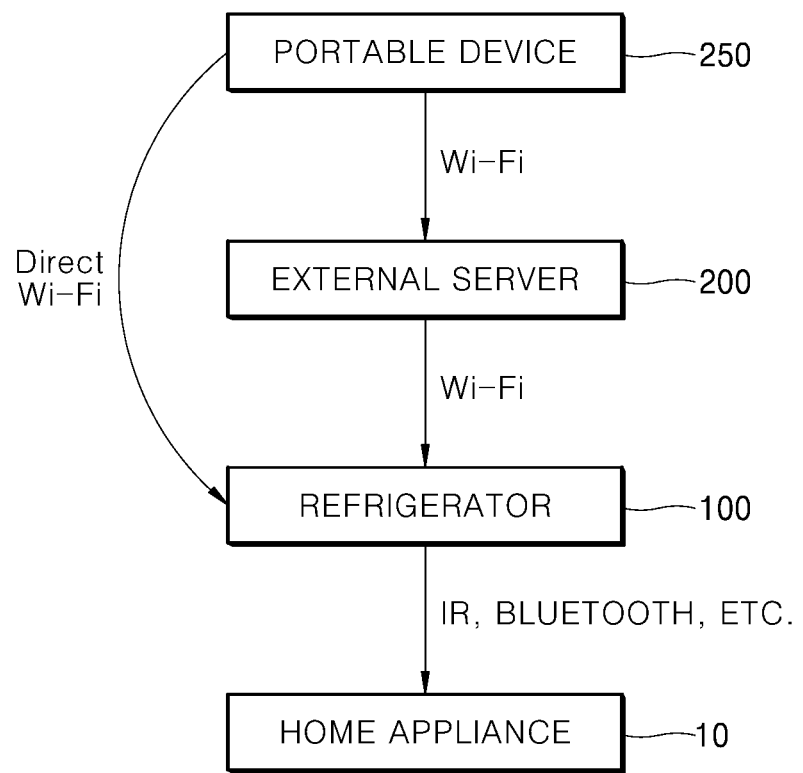
FIG. 2 is a view showing a configuration of a smart home controller refrigerator and other devices according to an exemplary embodiment of this application.

FIG. 2 is a view showing a configuration of a smart home controller refrigerator and other devices according to an exemplary embodiment of this application. The portable device 250 may include a computing device that uses mobile communication or occupies a small space, such as a tablet, a smart phone, and a computer, etc. In one embodiment, it is possible to directly control a refrigerator 100 (Direct Wi-Fi) by using a wireless LAN such as Wi-Fi in home, such as the smart phone or the tablet, or to indirectly control a refrigerator 100 through an external server 200.

The external server 200 may provide a function of providing setting information necessary in controlling the refrigerator 100 or providing data necessary for programming a control operation of the refrigerator 100. Further, when the portable device 250 is not disposed at home, the portable device 250 can control the refrigerator 100 through the external server 200.

The refrigerator 100 may receive control information transmitted from the portable device 250 or the external server 200 to transmit it to one or more home appliances 10 and operate an operation of the home appliance 10. For this purpose, it is possible to generate a signal of an infrared remote control that operates the home appliance 10 in a light emitting unit such as an infrared LED (IR LED) of the refrigerator 100. In addition, it is possible to generate a signal of a Bluetooth that operates the home appliance 10 in the refrigerator 100. A signal used in an operation protocol that controls the home appliances may be variously selected according to a property of a signal generating unit arranged in the refrigerator 100.

Figure 3:
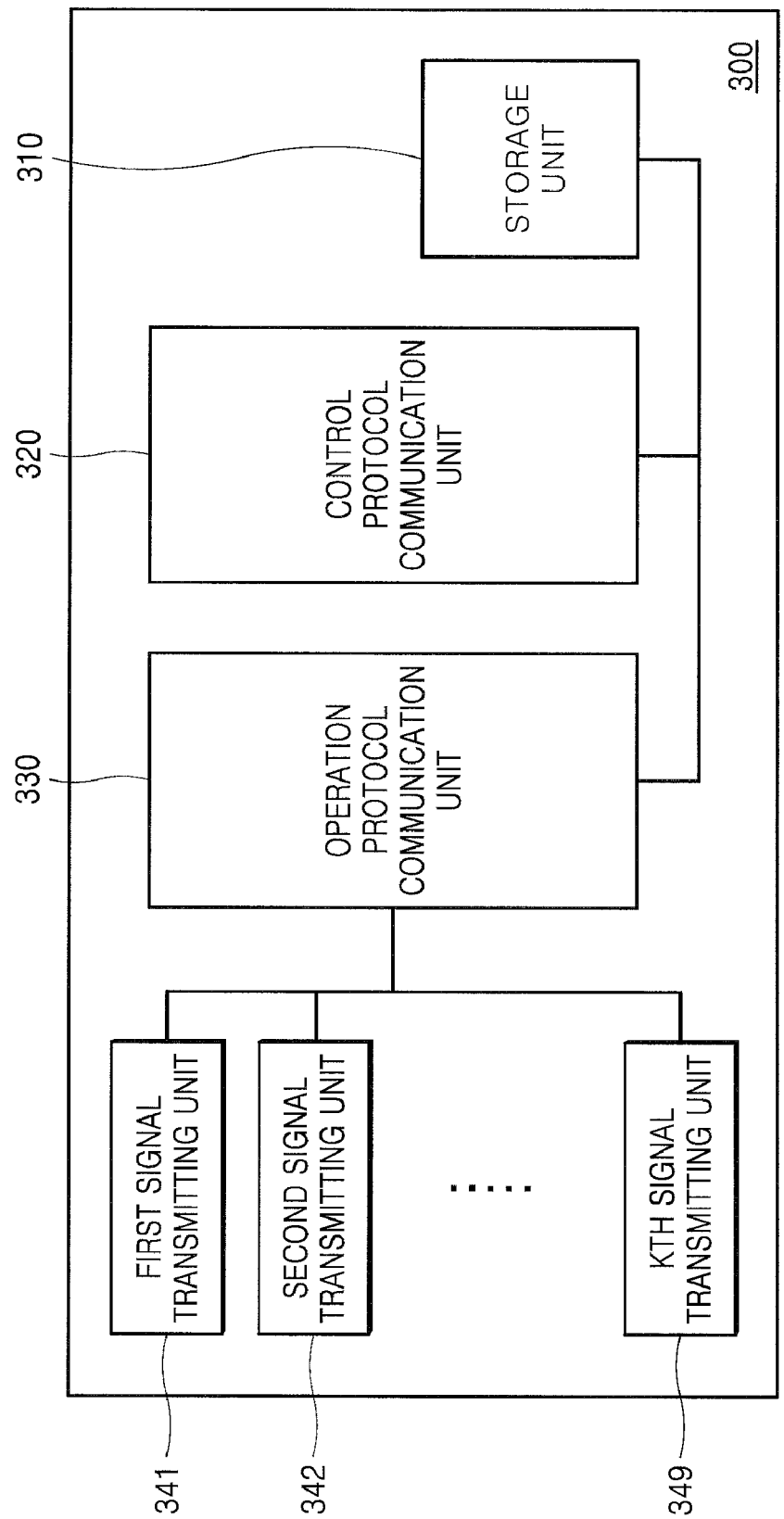
FIG. 3 is a view showing a configuration of a control unit for a smart home control of a refrigerator 100 according to an exemplary embodiment of this application.

FIG. 3 is a view showing a configuration of a control unit for a smart home control of a refrigerator 100 according to an exemplary embodiment of this application. A control unit 300 (or controller) may be arranged in a refrigerator and receive control information from an external server or a portable device to control a home appliance, and transmit operation information to a home appliance in home, and also show a transmission result of operation information of the home appliance to an external server and a portable device.

In view of a configuration of the control unit 300, the control unit 300 may include a storage unit 310 that stores information, a control protocol communication unit 320 that communicates with an external server or a portable device, and an operation protocol communication unit 330 that communicates with the home appliance in home. Further, the control unit 300 may include one or more signal transmitting units 341, 342, . . . , and 349 (or signal transmitter/receiver or transceiver, communication interface) that generate the signal for controlling the home appliances in home in the operation protocol communication unit 330.

As mentioned above, the control protocol communication unit 320 may include a communication module that uses a wireless LAN (Wi-Fi. Wireless LAN), mobile communication (mobile communication such as fourth generation or fifth generation) and receive control information from an external sever 200 or a portable device 250 according to a control protocol, and provide it to the operation protocol communication unit 330. The operation protocol communication unit 330 may control the signal transmitting units 341, 342, . . . , 349 so that the above-mentioned signal transmitting units 341, 342, . . . , 349 generate a signal necessary for operating the home appliance. The operation protocol communication unit 330 may control a home appliance in home by using various protocols (an operation protocol) such as Zigbee, infrared ray communication, Bluetooth communication, etc, as mentioned above.

The operation protocol communication unit 330 may generate an operation signal calculated from control information, and communicate according to an operation protocol which is a protocol different from the above-mentioned control protocol. That is, the control protocol is a protocol of a relatively long distance or more complicated configuration when compared with the operation protocol, whereas the operation protocol is a protocol of a short distance or a simple configuration suitable for a remote control.

In one embodiment of the present specification, the refrigerator 100 may use two distinct protocols, and more specifically, the control protocol may be suitable for receiving information for controlling home appliance from an external device or a portable device, and accordingly, transmitting a result that controls the home appliance. The operation protocol may be a protocol suitable for directly controlling a home appliance.

The storage unit 310 may store information on the operation signal required to control the home appliances in home. For example, when a TV is operated by Bluetooth, pairing information, and a kind of the operation signals, etc., can be stored. Further, when an air conditioner is controlled by an infrared remote control, identification information of infrared communication necessary for receiving an infrared operation signal, etc., can be stored. The information of the storage unit 310 may be set and stored through an external server 200 or a portable device 250.

When a user controls the home appliances in real time by using the portable device 250 and the refrigerator, the storage unit 310 may provide a storage function of temporary control information, and a memory that stores information may also be arranged in a control protocol communication unit 320 and an operation protocol communication unit 330. That is, the storage unit 310 may be selectively arranged in the control unit 300 or may be arranged by being coupled in another component.

The control protocol communication unit 320 may include a wireless LAN communication module for communicating with an AP for a wireless LAN communication in home and such a wireless LAN communication module may be arranged outside the refrigerator 100.

In summary, the control protocol communication unit 320 may receive control information that controls the home appliance in home from the external server 200 or the portable device 250. The control information that the control protocol communication unit 320 receives may include identification information on the home appliance in home, information on an operating protocol necessary for controlling the corresponding home appliance, schedule information, and information that controls an operation of the home appliance, etc.

In one embodiment of the control information, in the case of lamp, the control information may be identification information on lamp and an operation signal corresponding to ON/OFF. More specifically, when the infrared LED to be described later is used as a signal transmitting unit, the control information may be identification information of an infrared ray, frequency information, information on a base band signal, and information on a carrier signal necessary for controlling the corresponding lamp.

In another embodiment of the control information, when the infrared LED to be described later is used as a signal transmitting unit, identification information on an infrared ray or frequency information, information of a base band signal, information of a carrier signal, and information corresponding to an operation temperature of a corresponding air conditioner may be included in the control information. In addition, in the case of the infrared LED, bit information on each signal necessary for operation the home appliance may also be included in the control information.

The control information may include information to turn on or off the home appliance, or schedule an ON or OFF point of the appliance about a regular interval or time, or control an operation of the home appliance. Information that controls the operation may be control information that indicates a set temperature in the case of an air conditioner, and a volume control or a channel change may be control information in a case of a TV. In case of lamp, illumination may be control information.

Further, the storage unit 310 may store the information on operation signal required to control the above operation. The operation signal can be included in the above-mentioned control information.

The control information may be stored in the storage unit 310, and the stored control information may be generated as an operation signal in the operation protocol communication unit 330. In the above, it is possible to calculate the operation signal in the control information necessary in controlling the specific home appliance in the control information, and the generated operation signal may be transmitted in any one or two or more of a plurality of signal transmitting units 341, 342, . . . , and 349 coupled to the refrigerator. The transmitted operation signal may reach the home appliance in the same manner as being generated in the remote control of the corresponding home appliance and transmitted.

Further, the signal transmitting units 341, 342, . . . , and 349 may be arranged in a door that controls an opening and a closing of a storage space of the refrigerator, and as described in FIG. 1 in the above, they may be arranged in an interface unit 110 (or control interface) arranged on the front surface of the door. When the operation protocol is any one of infrared communication, Zigbee communication, Bluetooth communication, and UWB, the signal transmitting unit that generates the signal in response to the operation protocol may be arranged on a front surface of the refrigerator 100. In particular, the signal transmitting unit may be arranged in the interface unit 100 of the door of the refrigerator, and in still another embodiment, the signal transmitting unit may be arranged in a form protruding from an upper end of a door of the refrigerator. In addition, such a signal transmitting unit may be laid to a handle portion of the door of the refrigerator to widen a signal propagation range.

Figure 4:
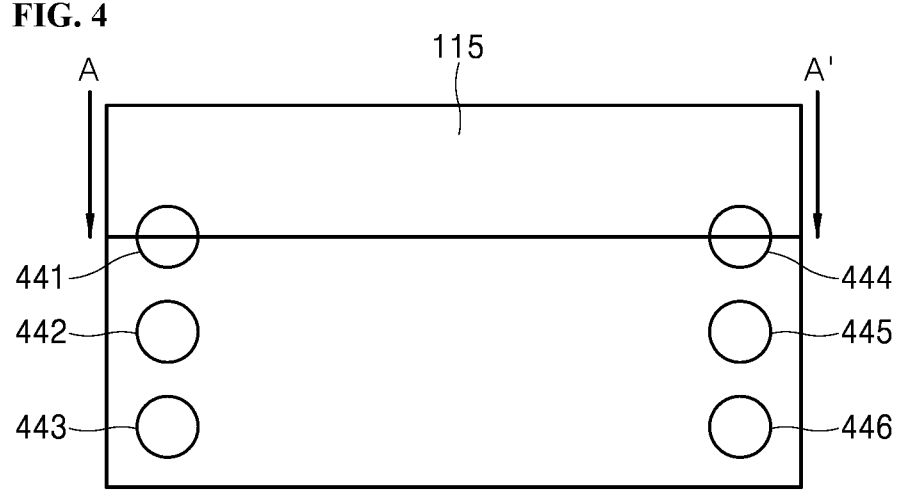
FIG. 4 is a view showing a configuration that generates an operation signal of a home appliance by using an infrared light emitting unit of a refrigerator according to an exemplary embodiment of this application.

FIG. 4 is a view showing a configuration that generates an operation signal of a home appliance by using an infrared light emitting unit of a refrigerator according to an exemplary embodiment of this application. FIG. 3 shows an embodiment in which a plurality of signal transmitting units 341, 342, . . . , and 349 are the infrared LEDs.

When enlarging the touch unit 115 in the refrigerator 100 of FIG. 1, it is as shown in FIG. 4. The touch unit 115 of FIG. 4 may be arranged with a plurality of infrared light emitting units 441, 442, 443, 444, 445, and 446 (or emitters). They may generate the signal in the same manner as an infrared signal that is provided in a remote control that controls the home appliances in home, so that a user can control a home appliance by using an infrared signal that the infrared light emitting units 441, 442, 443, 444, 445, and 446 of the refrigerator generate even in a state in which there is no separate remote control.

The infrared signal can be distinguished by a frequency and a wavelength length of a signal, and each of the home appliances and the remote control thereof may be configured to be operated according to a frequency of a unique infrared signal and an order of bit (1 or 0) corresponding to each operation. Further, according to a characteristic of the home appliance, it can be controlled by the number of the generations of a signal, in addition to the frequency of the infrared signal. A characteristic of the home appliance may be stored in the above-mentioned storage unit 310 of FIG. 3.

Each of the infrared light emitting units may be allocated in advance to control a home appliance, respectively. For example, the first infrared light emitting unit 441 may be allocated to generate an infrared signal that controls a TV, and the second infrared light emitting unit 442 may be allocated to generate an infrared signal that controls an electronic curtain, and the third infrared light emitting unit 443 may be allocated to generate an infrared signal that controls a desk lamp, and the fourth infrared light emitting unit 444 may be allocated to generate an infrared signal that controls an air conditioner, and the fifth infrared light emitting unit 445 may be allocated to generate an infrared signal that controls a Air Purifier, and the sixth infrared light emitting unit 446 may be allocated to generate an infrared signal that controls a living room lamp, respectively.

The above-mentioned infrared light emitting units may operate as a set with an infrared light receiving unit for touch recognition of an interface unit 110 in one embodiment. Accordingly, when controlling the operation of the refrigerator 100, it is possible to control a transmission and reception of an infrared ray with a set with an infrared light receiving unit, and when controlling the home appliances in home, the infrared light emitting unit may function as a signal transmitting unit of the remote control and generate and transmit a signal necessary for an operation of the home appliances.

In addition, the above-mentioned storage unit 310 of FIG. 3 may also store time information necessary for operating a specific home appliance, so that the operation of the home appliances can be scheduled in advance.

Further, the frequency of the infrared ray that the plurality of infrared light emitting units 441, 442, 443, 444, 445, and 446 generate so that the plurality of infrared light emitting units 441, 442, 443, 444, 445, and 446 transmit the operation signal to the same home appliance. In particular, by variously arranging a direction that the infrared ray emitting units 441, 442, 443, 444, 445, and 446 laid in the refrigerator transmit a signal, the infrared signal can be well transmitted to the home appliances in home. That is, when transmitting the operation signal in the refrigerator 100, by arranging the signal transmitting directions of the infrared light emitting units 441, 442, 443, 444, 445, and 446 to be different from each other, it can reach well the home appliance in home.

FIG. 5 is a view showing a signal transmission direction of the infrared light emitting units according to an exemplary embodiment of this application. 510 may show a signal direction of the infrared light emitting units 441, 442, 443, 444, 445, and 446 of FIG. 4 as an X-Y axis. The infrared light emitting unit 441 on an upper end in the left side may transmit a signal in a −X axis and +Y axis direction. The infrared light emitting unit 442 in the middle in the left side may transmit a signal in a −X-axis direction. Also, the infrared light emitting unit 443 at a lower end in the left side may transmit a signal in a −X and −Y axis direction.

On the other hand, in view of the infrared light emitting units 444, 445, and 446 in the right side of 510, the infrared light emitting unit 443 on an upper end in the right side may transmit a signal in a +X axis and +Y axis direction. The infrared light emitting unit 444 in the middle in the right side may transmit a signal in a +X axis direction. Also, the infrared light emitting unit 446 in a lower end in the right side may transmit a signal in a +X axis and −Y axis direction.

520 may show a signal transmission in a Z-axis direction in the configuration of 510. It can be confirmed that the signal transmission is also varied also in the Z-axis direction. For example, the infrared light emitting unit 442 in the middle in the left side can make the infrared signal be propagated to the front.

In an embodiment, in the configuration of FIG. 5, the infrared light emitting units 441, 442, 443, 444, 445, and 446 are arranged to transmit a signal in six directions in the X axis and the Y axis, and by arranging a signal transmitting unit that has a straightness or a directionality in various directions, it is possible to transmit a signal that operates an operation of a home appliance in home through the refrigerator 100. When the number of signal transmitting units is increased, it is possible to arrange it to transmit the signal in various directions based on the X/Y/Z axis. Further, unlike the configuration of FIG. 5, the signal transmitting unit according to various operation protocols can be arranged at the position on a refrigerator 100 suitable for a characteristic of each operation protocol. That is, in addition to a touch unit 115 or an interface unit 110, it is possible to arrange the signal transmitting units in other areas of the refrigerator 100.

Figure 6:
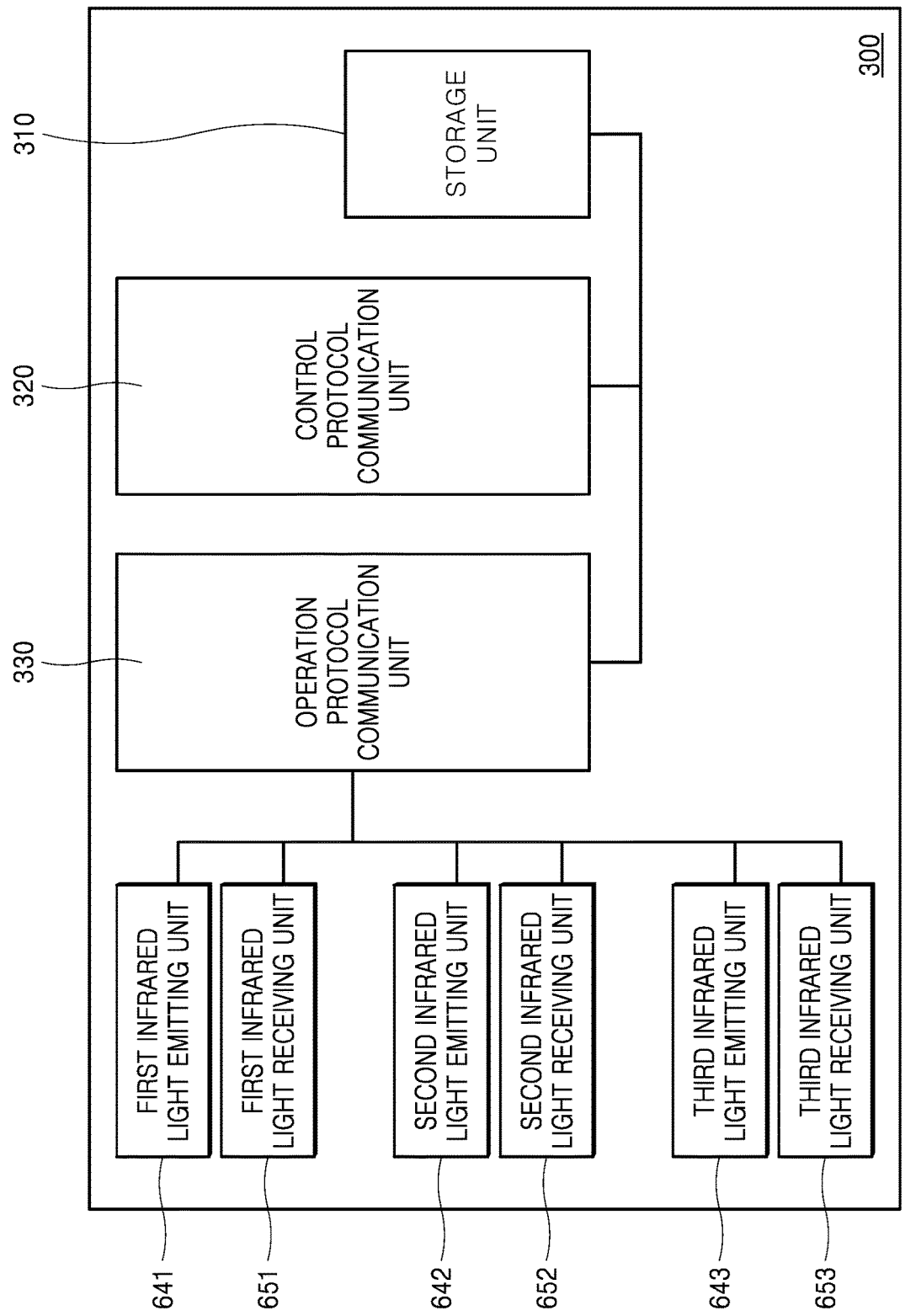
FIG. 6 is a view showing a configuration of an infrared light emitting unit and a light receiving unit according to an exemplary embodiment of this application.

FIG. 6 is a view showing a configuration of an infrared light emitting unit and a light receiving unit according to an exemplary embodiment of this application. A configuration that three infrared light emitting units 641, 642, and 643 (or emitters), and three infrared light receiving units 651, 652, and 653 (or receivers) are arranged will be mainly described.

As described in FIG. 4 in the above, three infrared light emitting units 641, 642, and 643 and three infrared light receiving units 651, 652, and 653 shown in FIG. 6 may be arranged on the touch unit 115, and the buttons required for a user to operate a refrigerator 100 may be displayed on the touch unit 115 and the user can control the refrigerator 100 by touching them. Further, three infrared light emitting units 641, 642, and 643 in FIG. 6 can generate an infrared signal for a remote control to control a home appliance in home. Accordingly, when the infrared light emitting units 641, 642, and 643 generate and transmit the infrared signal to control the home appliances in home, a control unit 300 may control the infrared light receiving units 651, 652, and 653 not to sense these infrared signals.

Alternatively, when the infrared light emitting units 641, 642 and 643 generate and transmit the infrared signal to control the home appliance in home, even if the infrared light receiving units 651, 652, and 653 sense the infrared signal, the control unit 300 may control it not to recognize it as a separate touch, that is, not to process a sensed infrared signal. Therefore, depending on whether a signal that the infrared light emitting units 641, 642, and 643 transmit is i) a generated infrared signal for touch input that controls a refrigerator, or ii) a generated infrared signal to control a home appliance, a control unit 300 may control the infrared light receiving units 651, 652, and 653 and an operation protocol communication unit 330 so that the infrared light receiving units 651, 652, and 653 process or does not process a signal by context awareness.

Figure 7:
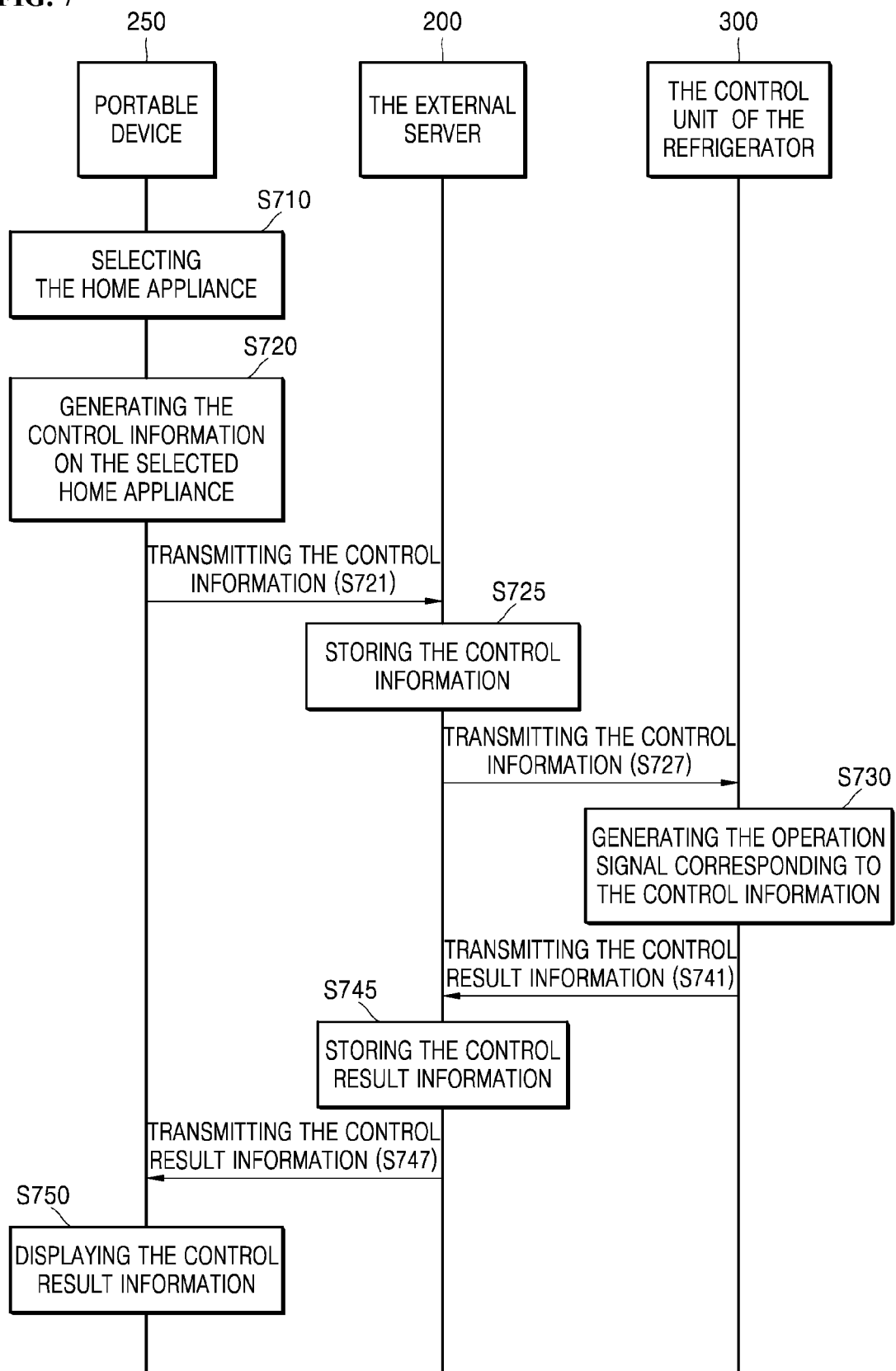
FIG. 7 is a view showing a process in which a smart home controller refrigerator according to an exemplary embodiment of this application receives control information from an outside through a control protocol, and accordingly operates a home appliance.

FIG. 7 is a view showing a process in which a smart home controller refrigerator according to an exemplary embodiment of this application may receive control information from an outside through a control protocol, and accordingly, may operate a home appliance. FIG. 7 is a view showing a process of operating in a configuration in which an external server 200 is arranged.

In order to set control information through an external server 200, a portable device 250 may firstly select a home appliance (S710). A selection of the home appliance can receive information on a home appliance in home on a list in home through ZigBee Bluetooth, infrared ray, or UWB communication. In still another embodiment, it is possible to receive information on a home appliance stored in the external server 200 in a list form. The portable device 250 can receive it from the external server 200 according to a control protocol such as a wireless LAN (Wi-Fi) or mobile communication, etc. When selecting a specific home appliance, the portable device 250 may generate control information to be applied to the home appliance (S720) and may transmit it to the external server 200 (S721). Even in the case of the transmission, the portable device 250 may transmit it to the external server 200 according to the control protocol such as the wireless LAN (Wi-Fi) or the mobile communication. An embodiment of the control information will be described in FIG. 10.

Further, identification information for the refrigerator may also be included in control information. For example, when using each refrigerator that a portable device is arranged in a space, the identification information on each refrigerator may be included.

The external server 200 may store received control information (S725) and may transmit it to a control unit 300 of the refrigerator (S727). S727 may also be proceeded according to the control protocol. The external server 200 and the control unit 300 of the refrigerator can be connected to each other to transmit and receive information according to a control protocol such as Wi-Fi or mobile communication. The control unit 300 that receives transmitted control information may generate an operation signal corresponding to the control information (S730). An operation protocol communication unit 330 of the refrigerator can transmit a generated operation signal in real time or according to the schedule.

In an embodiment, a transmission of the operation signal is the above-mentioned operation protocol, for example, a short distance communication protocol such as infrared communication, Bluetooth communication, UWB communication or Zigbee communication, and the operation signal can be transmitted by using these operation protocols. At this time, if there is schedule information in which the control information operates at a specific time, the control unit 300 may control the operation protocol communication unit 330 and a storage unit 310 to generate and transmit the operation signal after waiting by a corresponding time.

Thereafter, the control unit 300 may transmit control result information that a transmission of the operation signal is completed to the external server 200 (S741). At this time, information on whether a corresponding home appliance actually operates as a result of transmission of the operation signal may be included in the control result information. For example, when the home appliance notifies the operation completion or the failure through the operation protocol, these results may also be included in the control result information. It may be applied to a case where the control unit 300 of the refrigerator communicates with the home appliance through bidirectional infrared communication. In the case of bidirectional infrared communication, the infrared light receiving units 651, 652 and 653 can receive an operation result of the home appliance as shown in FIG. 6. In addition to that, it is possible to confirm the operation result of the home appliance even in Zigbee communication, UWB communication, or Bluetooth communication.

The external server 200 may store the transmitted control result information (S745) and may transmit it to the portable device 250 (S747). In one embodiment, the external server 200 can transmit control result information to the portable device 250 in real time. In another embodiment, the external server 200 may transmit control result information to the portable device 250 in a pre-appointed manner. For example, when the portable device 250 connects to the external server 200 at a regular interval, the external server 200 can transmit the stored control result information to the portable device 250.

The portable device 250 may display the received control result information (S750) so that a user can confirm an operation status and an operation result of the home appliance in home anywhere.

Figure 8:
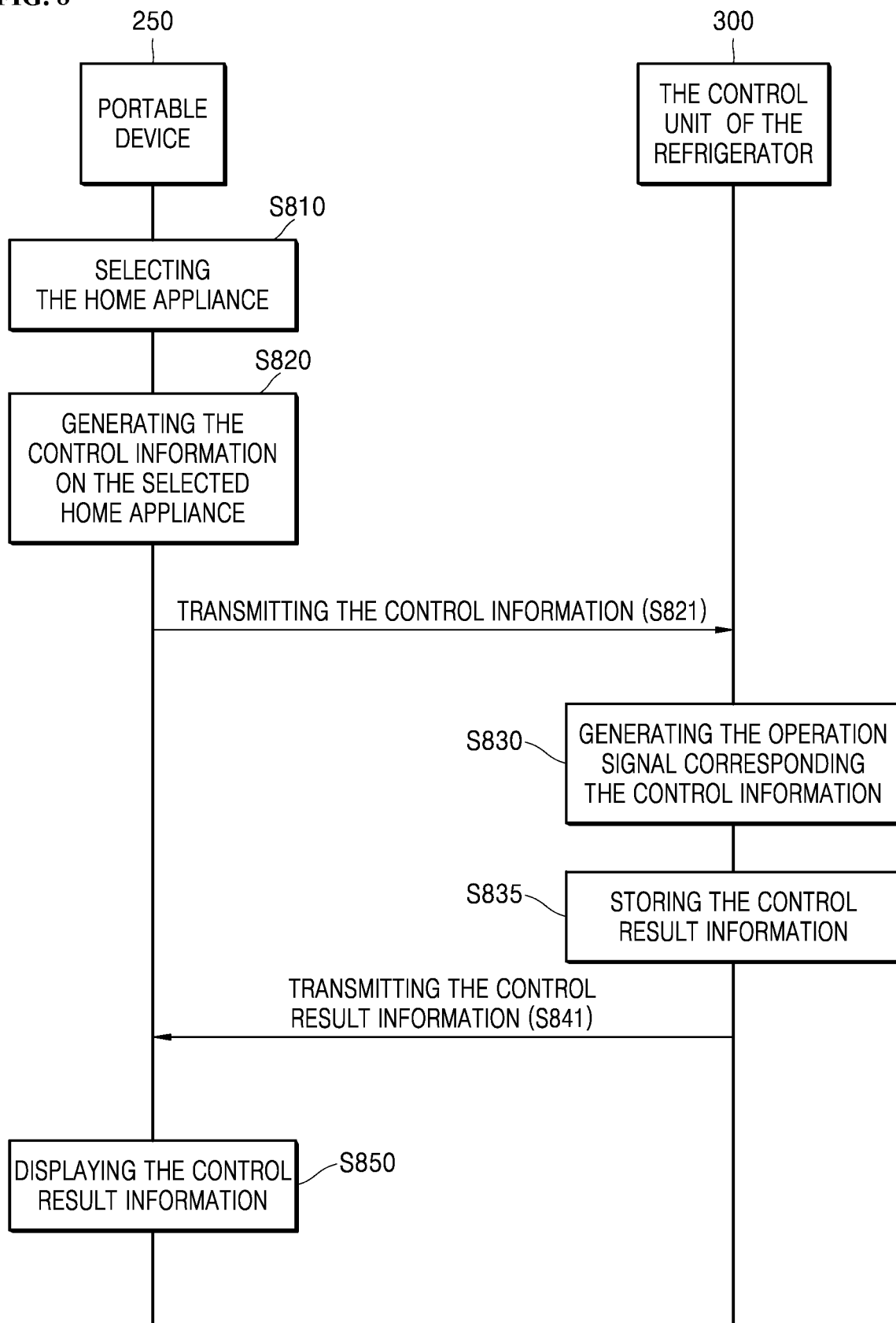
FIG. 8 is a view showing a process in which a smart home controller refrigerator according to an exemplary embodiment of this application receives control information from an outside through a control protocol, and accordingly operates a home appliance.

FIG. 8 is a view showing a process in which a smart home controller refrigerator according to an exemplary embodiment of this application receives control information from an outside through a control protocol, and accordingly operates a home appliance. FIG. 8 is a view showing a process in which a portable device 250 is directly connected to a control unit 300 of a refrigerator. This is an embodiment of the direct Wi-Fi (Direct WiFi) of FIG. 2 in the above.

The portable device 250 may firstly select the home appliance (S810). A selection of the home appliance can receive information on the home appliance in home by a list through Zigbee, or Bluetooth, infrared communication, etc. In still another embodiment, it is possible to receive information on home appliance stored in the control unit 300 of the refrigerator in a list form. The portable device 250 can receive the above-mentioned information from the control unit 300 of the refrigerator according to a control protocol such as a wireless LAN (Wi-Fi) or mobile communication, etc. When selecting a specific home appliance, the portable device 250 may generate control information to be applied to the home appliance (S820) and may transmit it to the control unit 300 of the refrigerator (S821). The portable device 250 can transmit control information to the control unit 300 of the refrigerator according to a control protocol such as Wi-Fi or mobile communication. An embodiment of the control information will be described later.

The control unit 300 that receives the transmitted control information may generate an operation signal corresponding to the control information (S830). An operation communication unit 330 of the refrigerator may transmit a generated operation signal in real time or according to a schedule. A transmission of the operation signal may be the same as S730 of FIG. 7 mentioned above. At this time, if there is schedule information in which the control information operates at specific time, the control unit 300 may control the operation protocol communication unit 330 and the storage unit 310 to generate and transmit the operation signal after waiting by predetermined time.

Thereafter, the control unit 300 may store control result information that the transmission of the operation signal is completed to a storage unit 310 and may transmit it to the portable device 250. A storage of the control result information may be selectively made. For example, if the portable device 250 and the control unit 300 is in a state capable of a communication in real time, it is possible to immediately transmit the control result information without storing it. On the other hand, if the portable device 250 and the control unit 300 cannot communicate with each other, the control unit 300 may store the control result information in the storage unit 310, and when it becomes a point capable of communicating with the portable device 250, it is possible to transmit it.

Further, although not shown in the drawing, when the portable device 250 and the control unit 300 cannot communicate with each other, the control unit 300 may transmit the control result information to the external server 200 as shown in FIG. 7 so that the external server 200 may transmit the control result information to the portable device 250.

In the above, as described in FIG. 7, information on whether the corresponding home appliance actually operates after the result of the transmission of the operation signal may be included in the control result information.

The portable device 250 may display the received control result information (S850) so that a user can confirm an operation status and an operation result of the home appliance in home.

Figure 9:
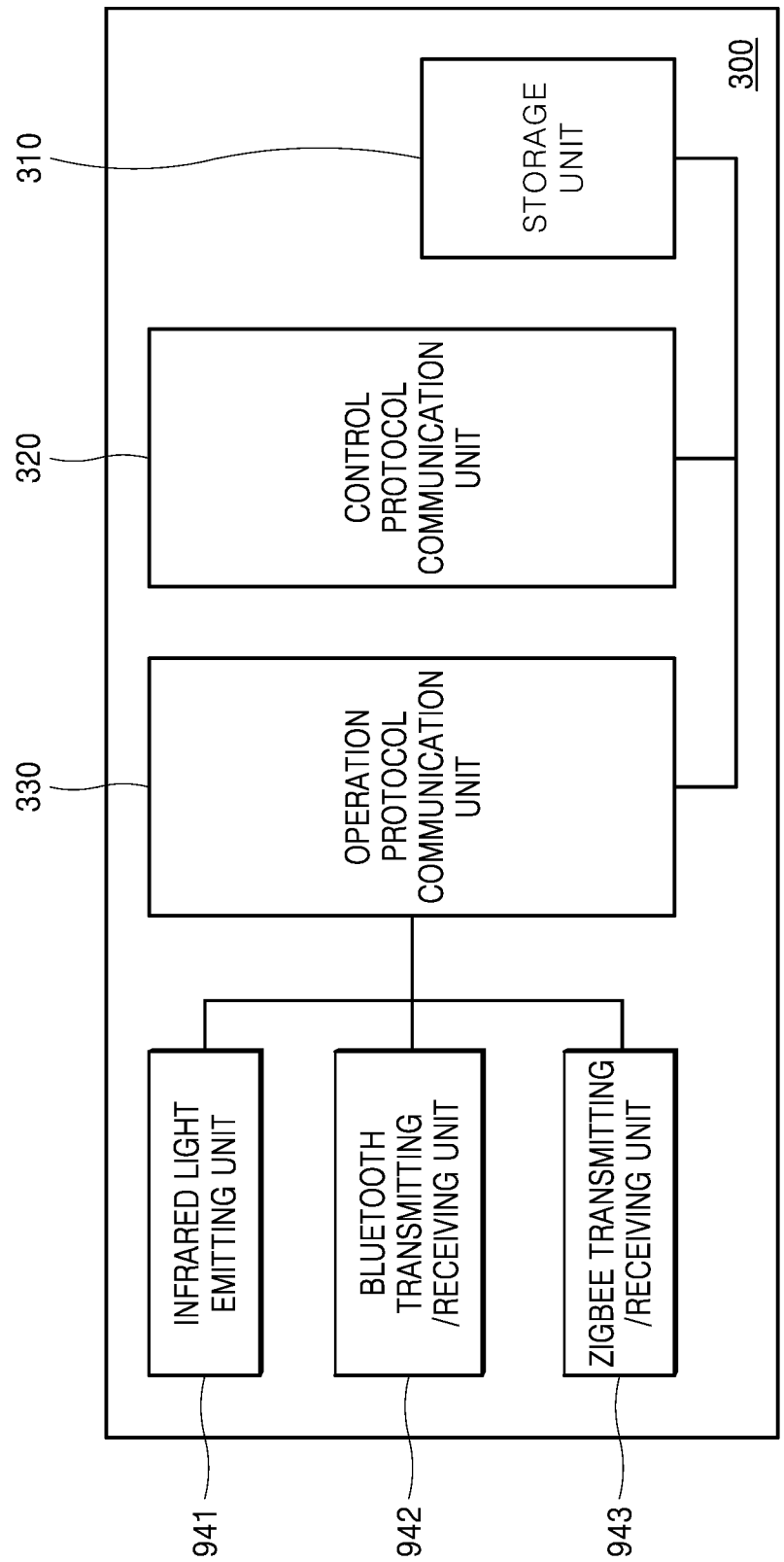
FIG. 9 is a view that controls a signal transmitting unit with various kinds of operation protocols according to an exemplary embodiment of this application.

FIG. 9 is a view controlling a signal transmitting unit with various kinds of operation protocols according to an exemplary embodiment of this application. Three types of signal transmitting units may be arranged as a component of the control unit 300 of the refrigerator described above.

An infrared light emitting unit 941 that transmits an infrared signal, a Bluetooth transmitting/receiving unit 942 that transmits/receives a Bluetooth signal, and a Zigbee transmitting/receiving unit 943 that transmits/receives a ZigBee signal may operate as signal transmitting unit, respectively, and may transmit an operation signal by an operation protocol suitable for each home appliance.

In an embodiment, the infrared light emitting unit 941, Bluetooth transmitting/receiving unit 942, the Zigbee transmitting/receiving unit 943, which are the signal transmitting units, may be arranged in an interface unit 110 or a touch unit 115 of the refrigerator mentioned above.

An operation protocol communication unit 330 can generate an operation signals in accordance with three operation protocols. That is, the operation protocol communication unit 300 may use two or more protocols, and accordingly, the infrared light emitting unit 941, a Bluetooth transmitting/receiving unit 942, and a Zigbee transmitting/receiving unit 943 may be arranged at various areas of the interface unit 110 or the touch unit 115. Further, in addition to the interface unit 110 and the touch unit 115, the above-mentioned infrared light emitting unit 941, the Bluetooth transmitting/receiving unit 942, and the Zigbee transmitting/receiving unit 943, which are the signal transmitting units, may be arranged at various areas outside the refrigerator 100. Thus, one or more signal transmitting units may be arranged at a corner portion of the door of the refrigerator, and an upper surface of the refrigerator, etc., so that the signal of the operation protocol, that is, the infrared signal, the Bluetooth signal, or the Zigbee signal, etc., can be well transmitted. That is, the signal transmitting unit can be arranged in a specific area of the refrigerator that is best propagated in home according to a type and a characteristic of a signal that is used.

In view of the Bluetooth transmitting/receiving unit 942 in more detail, according to the property of the Bluetooth communication that proceeds a pairing, a control unit 300 of the refrigerator can control a process of pairing with a plurality of home appliances. Information of pairing with the home appliance to transmit/receive a wireless signal in accordance with the Bluetooth may be stored in the storage unit 310. When transmitting a wireless signal for an operation in an operation protocol communication unit 330, it may generate the wireless signal by the Bluetooth signal in the operation protocol communication unit 330 and the Bluetooth transmitting/receiving unit 942 may transmit a generated wireless signal. It is possible to receive a result according to a transmission, and it may be included in control result information as described in FIGS. 7 and 8.

The infrared light emitting unit according to an exemplary embodiment of this application may provide both a signal transmitting unit and a touch sensing function and may be arranged as the signal transmitting unit in the interface unit 100 or the touch unit 115 of the refrigerator. This application is not limited thereto, and the infrared light emitting unit may be arranged in various portions of the refrigerator.

FIG. 10 is a view showing a screen for controlling a home appliance in a portable device according to an exemplary embodiment of this application and information stored in a storage unit of a refrigerator. In one embodiment, it is an embodiment in which schedule information is included in control information.

A control of a home appliance may be made through a control unit 300 of the refrigerator mentioned above. 1001 in FIG. 10 may show an interface of an Application that is driven in a portable device. A home appliance and control information of a home appliance that a user has to control every hour may be shown.

The control information set as 1001 in FIG. 10 may be stored in a storage unit 310 of the control unit 300 of the refrigerator, such as 1010. In view of 1010 more detail, "Serial" may be a Serial Number which is an identifier of each control information record. The control information generated each time may be distinguished by an independent Serial number. That is, it is possible to set control information for a separate time for the same home appliance, and it is possible to use a Serial number to provide control result information according to the control information to a portable device or an external server.

"Time" may indicate information on start time. "Protocol" may include a type of an operation protocol and "ID" may include information that identifies a home appliance. "Info" may mean information necessary for generating or transmitting an operation signal. It may include a characteristic (IR_ID1, IR_ID2, . . . , IR_ID9) of an infrared signal to be transmitted to a specific home appliance, for example, a frequency, an identifier, a characteristic of a Baseband Signal, a characteristic of a carrier signal, etc. In the case of ZigBee, it may include information on a beacon which is necessary information (Zigbee_1) according to a ZigBee protocol. In the case of Bluetooth, information (BT_1) necessary for transmitting/receiving a Bluetooth signal according to Bluetooth communication such as information for pairing with a home appliance may be included. The "Info" portion may be information that is persistently applied to a home appliance, and the information may be managed separately On the other hand, "Signal1", "Signal2", and "Signal3" may mean a kind of an operation signal to be transmitted in order. "Duration" may mean time that is maintained after operation. It may be time that maintains a state that a home appliance is turned on, which is ON. "Result" may show a result after a transmission of an operation signal. The result can be configured in various ways, for example, whether or not an operation signal was transmitted correctly and whether or not a home appliance that receives an operation signal received the operation signal correctly, etc. If the operation signal is bidirectional communication, a reception or not may be included in a "Result" item, and when the operation signal is unidirectional communication, a transmission or not may be included in "Result" item; however, this application is not necessarily limited thereto, and various result information may be included in the "Result" item according to a type of the home appliance.

In the case of the infrared signal, it may be a result whether or not the refrigerator has correctly transmitted a signal at corresponding time. For example, in the case in which an IR signal cannot be transmitted at corresponding time due to a problem of an electrical supply of the refrigerator, it may be set to Fail or Fail due to power failure (Fail_Shutdown), etc. Further, when a receiving side of the operation protocol of the home appliance is not in a communication state (Not_Connected), it may be a kind of a result. When transmitting the operation signal with ZigBee or Bluetooth and receiving a result thereof, a reception result can be stored in the Result. The result stored in these Result items may form control result information and may be transmitted to a portable device or an external server.

A control information record of Serial number 1951 may be for a living room air conditioner (ID: Aircon_1). The living room air conditioner may be controlled by an infrared signal, and a firstly transmitted signal (Signal1) may be "ON" and the subsequently transmitted signal (Signal2) may be "Temp_24", that is, it may mean an operation signal that indicates to set an operation temperature of an air conditioner to 24 degrees. Time information starting from 9:00 and maintained for 3 hours may be included in the "Duration" item. According to the "Duration" item, after three hours passes, an operation signal that indicates "OFF" may be transmitted.

A control information record of Serial number 1952 may operate a living room lamp (Lamp_1) controlled by an infrared signal and may be maintained for one hour.

A control information record of Serial number 1953 may operate an air purifier (AirPurifier_1) controlled by a ZigBee signal and may be maintained for one hour.

A control information record of Serial number 1954 may operate all lamp (ALL_LAMP) controlled by an infrared signal and a Bluetooth signal, and may be maintained for four hours.

A control information record of Serial number 1955 may include two operation signals (Signal1 and Signal2) that turn on a TV (TV_1) controlled by an infrared signal and switch a channel to 11 (MBC). This may be maintained for one hour.

Finally, a control information record of Serial number 1956 may operate an air conditioner in a main room (Aircon_2) controlled by a Bluetooth signal.

Through 1001 and the control information 1010 corresponding thereto of FIG. 10, at corresponding time, the control unit 300 of the refrigerator may generate and transmit the signal (infrared signal, the Zigbee signal, or the Bluetooth signal) corresponding to the corresponding home appliance, and the home appliance that receives it may be controlled in the same manner as being controlled by a remote control.

The control unit 300 of the refrigerator can control an operation protocol communication unit and a corresponding signal transmitting unit such that an operation signal corresponding to the control signal is transmitted to the home appliance at the time set in the schedule information such as the start time (Time) and the operation time (Duration) of 1010. In addition, the control unit 300 of the refrigerator can check the operation time (Duration) and control the operation protocol communication unit and the corresponding signal transmitting unit so that an "OFF" signal is transmitted to the home appliance.

FIG. 11 is a view that control result information according to an exemplary embodiment of this application is displayed in a portable device.

1110 may be a form in which a result that performed the control is stored in a Result of the control information 1010 of FIG. 10. 1101 may show an interface of an Application running on a portable device. 1110 may show that OK is an operation success, and NOT_CONNECTED may show that communication is not connected and a connection is failed, and FAIL_SHUTDOWN may show that an operation signal is not transmitted due to a power failure, etc., at a corresponding point.

Each of these Serial numbers and results may form control result information and can be displayed on a portable device, such as 1101. As described in FIGS. 7 and 8, in a state in which a control unit 300 of a refrigerator stores information, it may be transmitted to an external server 200 or a portable device 250. A transmission may be made in real time or a predetermined time interval. That is, when it is set as to whether to receive the control result information in real time in the portable device, or to receive it according to a regular time interval (for example, one hour), the control result information may be transmitted between the portable device and the external server, or the portable device and the refrigerator, or the external server and the refrigerator accordingly.

Figure 12:
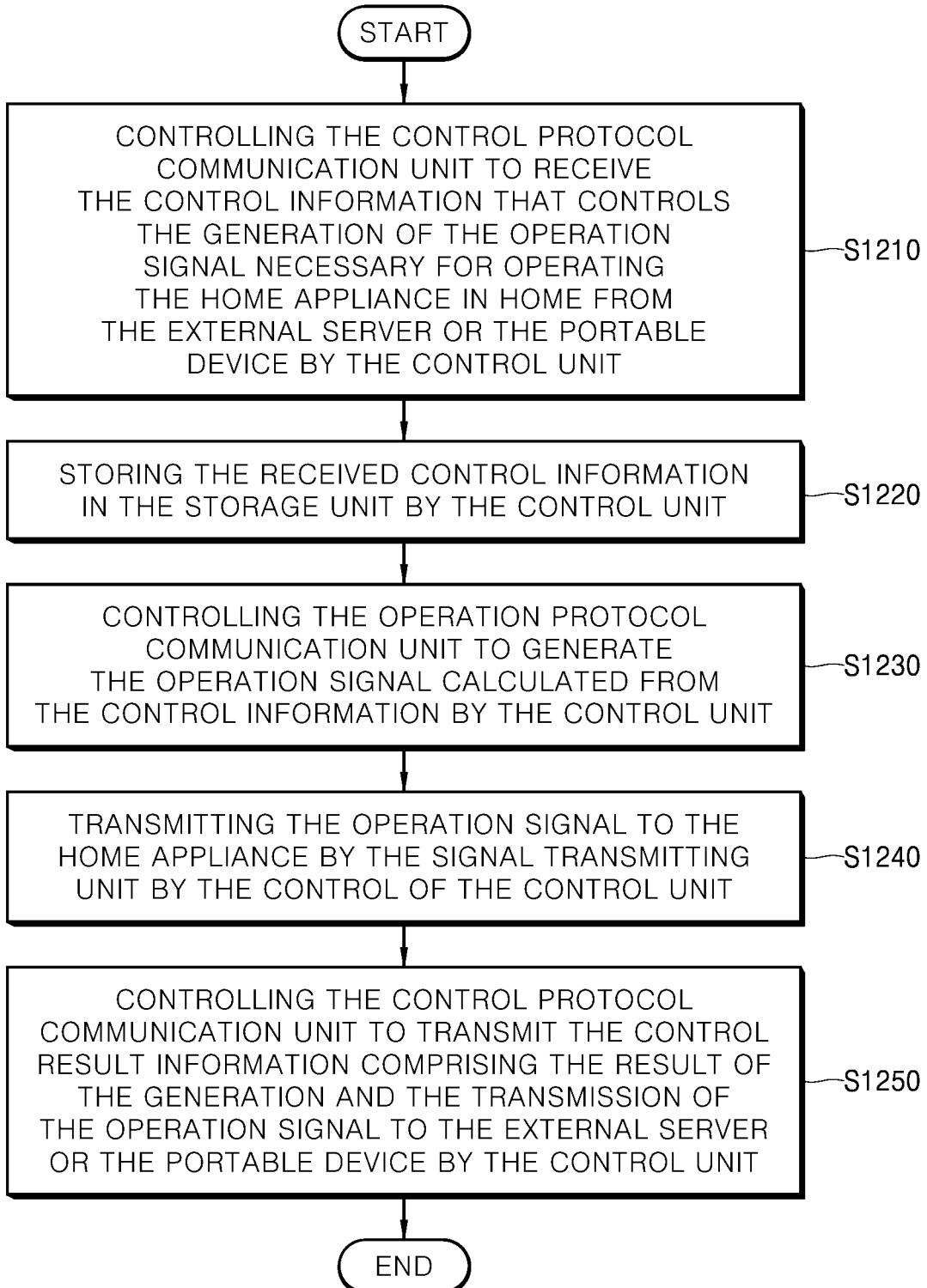
FIG. 12 is a view showing an operation process of a refrigerator according to an exemplary embodiment of this application.

FIG. 12 is a view showing an operation result of a refrigerator according to an exemplary embodiment of this application.

A configuration and an operation process of the refrigerator 100 and the control unit 300 that controls the same shown in FIGS. 1 to 11 are the same as in FIG. 12.

The control unit 300 may control a control protocol communication unit 320 (or communication module) to receive control information that controls a generation of an operation signal necessary for operating a home appliance in home (S1210). The reception may be made from an external server or a portable device. It is possible to receive the control information by using a wireless LAN (Wi-Fi), mobile communication (fourth generation communication such as LTE-A), and to receive it from the external server 200 as in FIG. 7, or to receive it from the portable device 250 as in FIG. 8.

The control unit 300 may store the received control information in a storage unit 310 (or storage, memory) (S1220). The control unit 300 may control an operation protocol communication unit 330 (or communication module) to generate an operation signal calculated from the control information (S1230). A generated signal may be transmitted to the home appliance. That is, by a control of the control unit 300, the signal transmitting unit may transmit the operation signal to the home appliance 10 (S1240).

In one embodiment, in a case in which there is schedule information such as start time in the control information stored in the storage unit 310, the control unit 300 can control the operation protocol communication unit 300 so that the operation signal corresponding to the control information is transmitted to the home appliance at corresponding time. On the other hand, when there is no separate schedule information, the control unit 300 may control the operation protocol communication unit 330 immediately so that the operation signal corresponding to the control information is transmitted to the home appliance.

When a transmission of the operation signal is completed in response to the control information, or an error occurs in the transmission of the operation signal, or an operation result of the home appliance is received, the control protocol communication unit 320 may transmit it to the external server or the portable device as control result information. That is, the control unit 300 may control the control protocol communication unit 300 to transmit control result information including the result of the generation and the transmission of the operation signal to the external server or the portable device (S1250).

Hereinafter, various embodiments in arranging an infrared light emitting unit, which is a signal transmitting unit that transmits an infrared signal of this application, will be described. As shown in FIG. 1 in the above, the interface unit such as 110 may be arranged. The interface such as 110 may be a glass and may include the display unit 111 and the touch unit 115 therein. Further, as mentioned above, the display unit 111 and the touch unit 115 can be seamlessly arranged, and the touch unit 115 may include a light emitting unit that emits a light by an LED using an infrared LED, and a light receiving unit that receives an emitted signal herein.

Accordingly, the interface unit 110, which the infrared light emitting unit may be included, may serve as a kind of door or may serve to show an inside of a refrigerator. For example, the portion 110 in FIG. 1 may be opened and closed independently of a door of an original refrigerator.

The infrared light emitting unit may be arranged on the display unit 111 or the touch unit 115, and the embodiment that laying the infrared light emitting unit will be described in more detail.

In the above, in FIGS. 4 and 5, by variously setting the directions of the signals that the infrared light emitting units transmit, it may be configured to increase a signal transmission rate to home appliances in home. Therefore, the configuration of the infrared light emitting unit may be arranged to transmit the signal from the front surface of the refrigerator to various spaces in home. A configuration in a case of implementing it as the infrared light emitting unit will be described in more detail in FIGS. 4 and 5.

Figure 13:
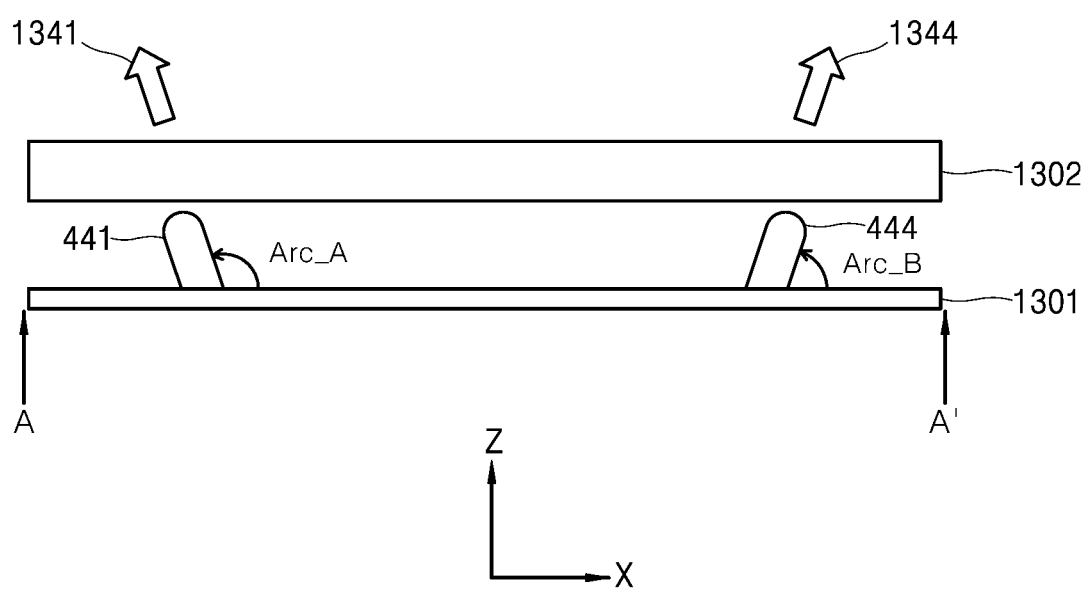
FIG. 13 is a view showing a configuration in which an infrared light emitting unit according to an exemplary embodiment of this application is arranged.

FIG. 13 is a view showing a configuration in which an infrared light emitting unit according to an embodiment of this application is arranged. In the touch unit 115 of FIGS. 4 and 5, it may show that the light emitting unit is arranged to face in various directions. The cross sections A-A' of the configuration arranged with 441 and 444 of FIGS. 4 and 5 may be shown as an embodiment. The touch unit 115 may be arranged with a substrate 1301 at the lower end, and a glass 1302 that transmits an infrared ray may be arranged on an upper surface. The infrared light emitting units 441 and 444 connected to the substrate 1301 may be connected and arranged. Here, two infrared light emitting units 441 and 444 can adjust Arc_A and Arc_B differently so that an infrared signal can be transmitted in different directions 1341 and 1344, respectively. Of course, according to the embodiment of this application, all the angles in an arrangement of the infrared light emitting units 441 and 444 may be formed to be a right angle. When Arc_A and Arc_B are formed to be 90 degrees, a direction of the infrared ray may be directed toward the front of the door of the refrigerator and go straight, and may be formed so as not to go straight obliquely.

On the other hand, when an infrared light receiving unit and an infrared light emitting unit form the touch unit 115, a position of the infrared light receiving unit can also be changed as the infrared light emitting unit is arranged at various angles. It will be described in more detail in FIG. 14.

Figure 14:
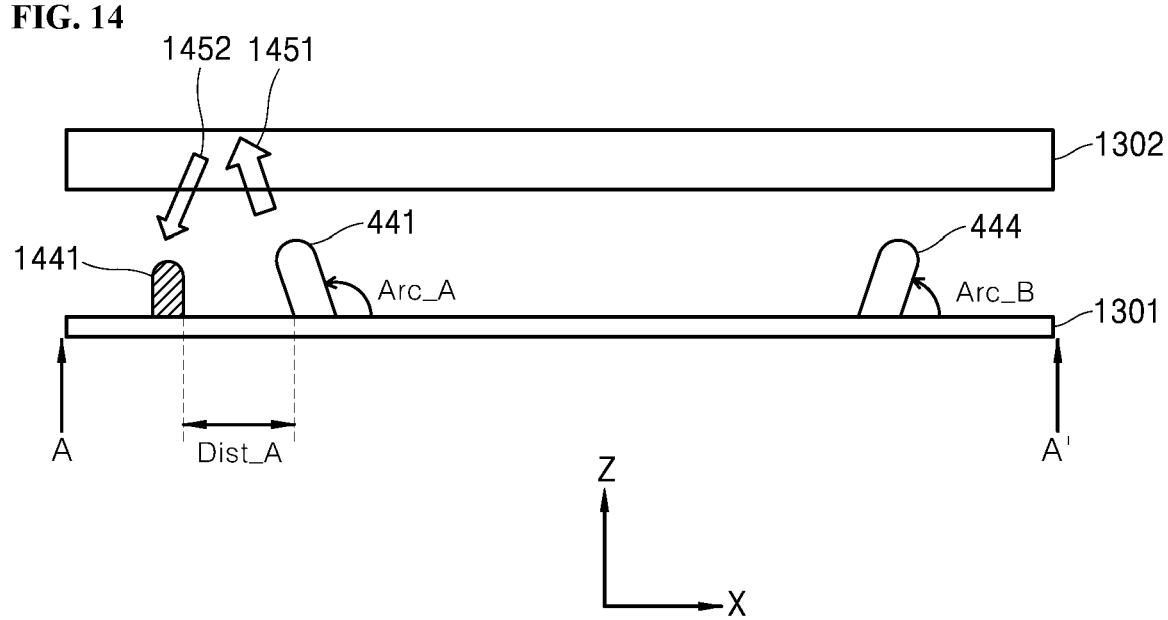
FIG. 14 is a view showing a configuration in which an infrared light emitting unit and an infrared light receiving unit according to an exemplary embodiment of this application are arranged.

FIG. 14 is a view showing a configuration in which an infrared light emitting unit and an infrared light receiving unit according to an exemplary embodiment of this application are arranged. It is reviewed in the above that it is possible to receive an LED infrared signal emitted in the infrared light emitting unit from an infrared light receiving unit, and as a result, a refrigerator 100 can sense a tough of a user.

In FIG. 14, when the infrared light receiving unit 1441 is touched from an outside, a light of an infrared light emitting unit 441 may be reflected and received as 1452. The distance Dist_A between the infrared light emitting unit 441 and the infrared light receiving unit 1441 may be proportional to Arc_A. As Arc_A becomes larger, the infrared signal 1451 emitted from an infrared light emitting unit is emitted close to a horizontal direction, and it is possible to adjust Dist_A in order for light 1452 that the light 1451 is reflected by a touch generated from a glass 1302 outside to be incident on the infrared light receiving unit 1441 direction. If Dist_A is short, it is possible to arrange a partition between the infrared light emitting unit 441 and the infrared light receiving unit 1441 to prevent the light emitted from the infrared light emitting unit 441 from being reflected and to prevent it from being incident on the infrared light receiving unit 1414 directly.

Figure 15:
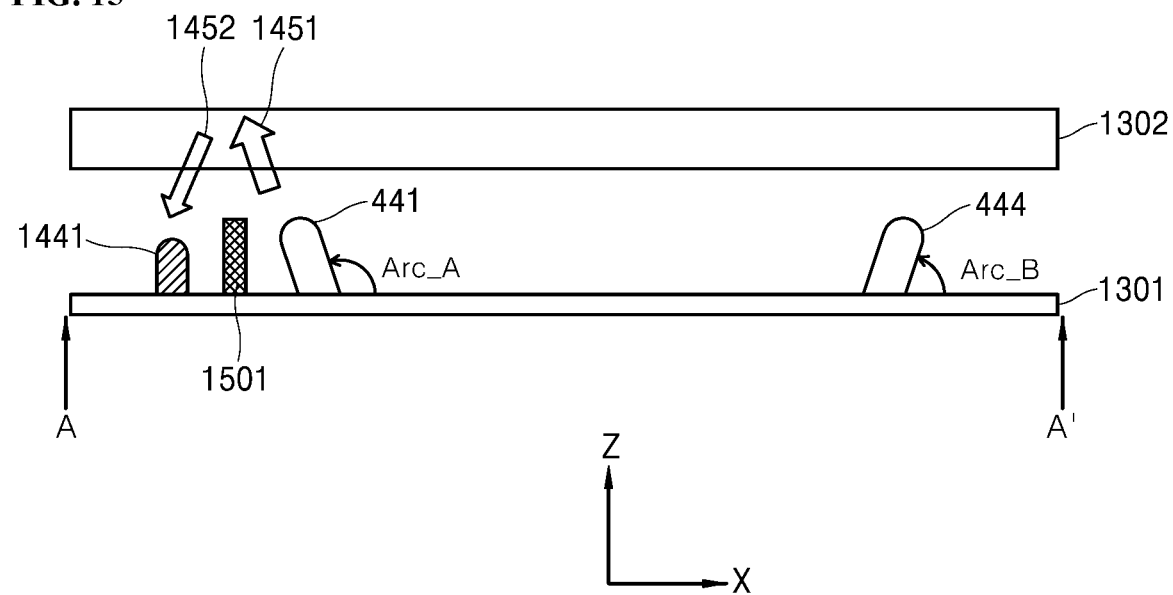
FIG. 15 is a view showing a configuration in which an infrared light emitting unit and an infrared light receiving unit according to another embodiment of this application are arranged.

FIG. 15 is a view showing a configuration in which an infrared light emitting unit and an infrared light receiving unit according to another embodiment of this application are arranged. A partition 1501 may be arranged between an infrared light emitting unit 441 and an infrared light receiving unit 1441 to prevent an infrared signal from directly proceeding from the infrared light emitting unit 441 to the infrared light receiving unit 1441.

Figure 16:
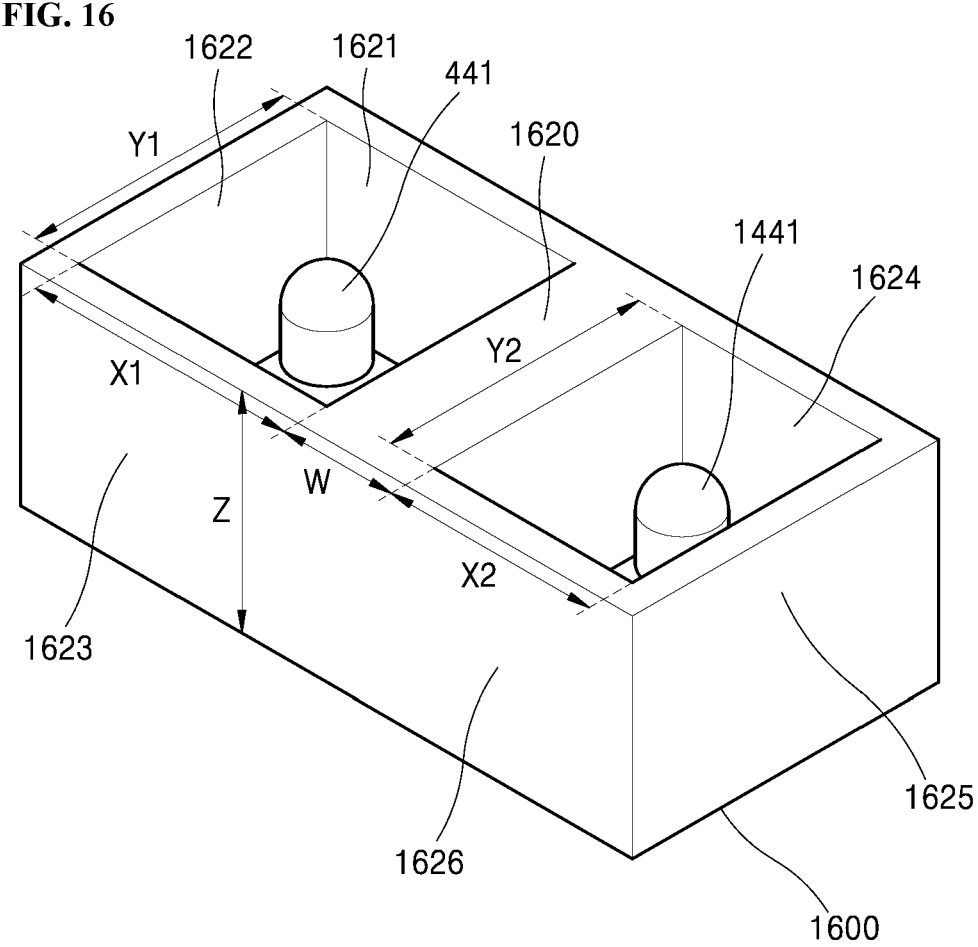
FIG. 16 is a view showing a configuration in which an infrared light emitting unit and an infrared light receiving unit according to an exemplary embodiment of this application are arranged in an element case.

FIG. 16 is a view showing a configuration in which an infrared light emitting unit and an infrared light receiving unit according to an exemplary embodiment of this application are arranged in an element case.

The element case 1600 may provide a first accommodation space formed by the first walls 1621, 1622, and 1623 and a partition 1620 and a second accommodation space formed by the second walls 1624, 1625, and 1626 and a partition 1620. The first accommodation space may have the volume according to the width X1, the length Y1, and the depth Z, and the second accommodation space may have the volume according to the width X2, the length Y2, and the depth Z. An infrared light emitting unit 441 may be arranged in the first accommodation space and an infrared light receiving unit 1441 may be arranged in the second accommodation space. As mentioned above, the width W of an upper surface of the partition 1620 can be increased according to a tilted angle Arc_A of the infrared light emitting unit 1641.

Although not shown in FIG. 16, it is possible to adjust a direction of an infrared light emitting unit 441. For example, Arc_A shown in FIGS. 13 to 15 may maintain a fixed value; however, it may be arranged so as to rotate while maintaining a constant gap between a substrate 1301 and the infrared light emitting unit 441. In this case, it is possible to set the infrared light emitting unit to transmit the signal in any one direction among above-mentioned various directions of FIG. 5.

Figure 17:
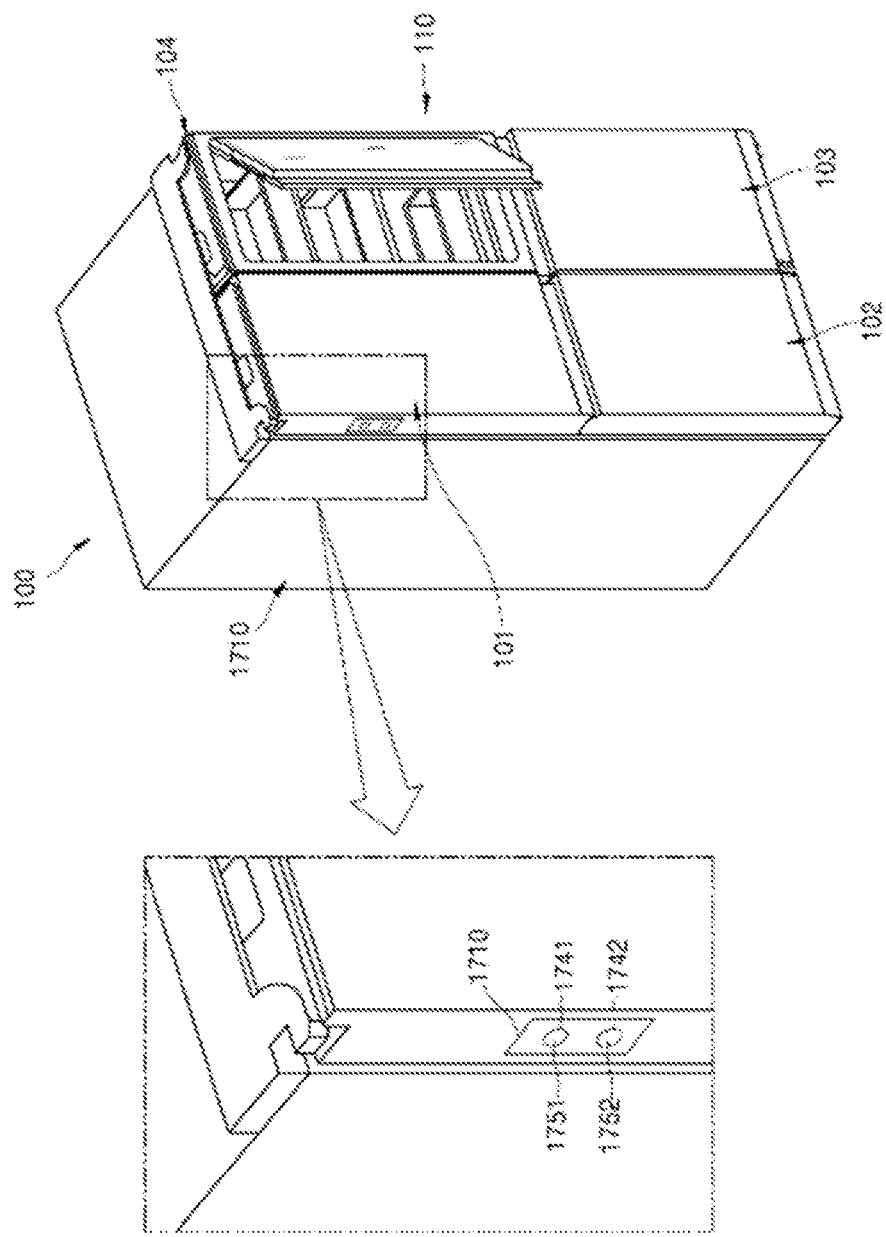
FIG. 17 is a view showing the refrigerator in FIG. 1.

FIG. 17 is a view showing the refrigerator 100 described in FIG. 1. FIG. 1 is still another embodiment of the refrigerator. In FIG. 17, the signal transmitting units 1741 and 1742 may be arranged on a side surface of a refrigerator door 101. This can increase a receiving rate of the operation signals 1751 and 1752 of a home appliance arranged on a side direction of a refrigerator 100.

Figure 18:
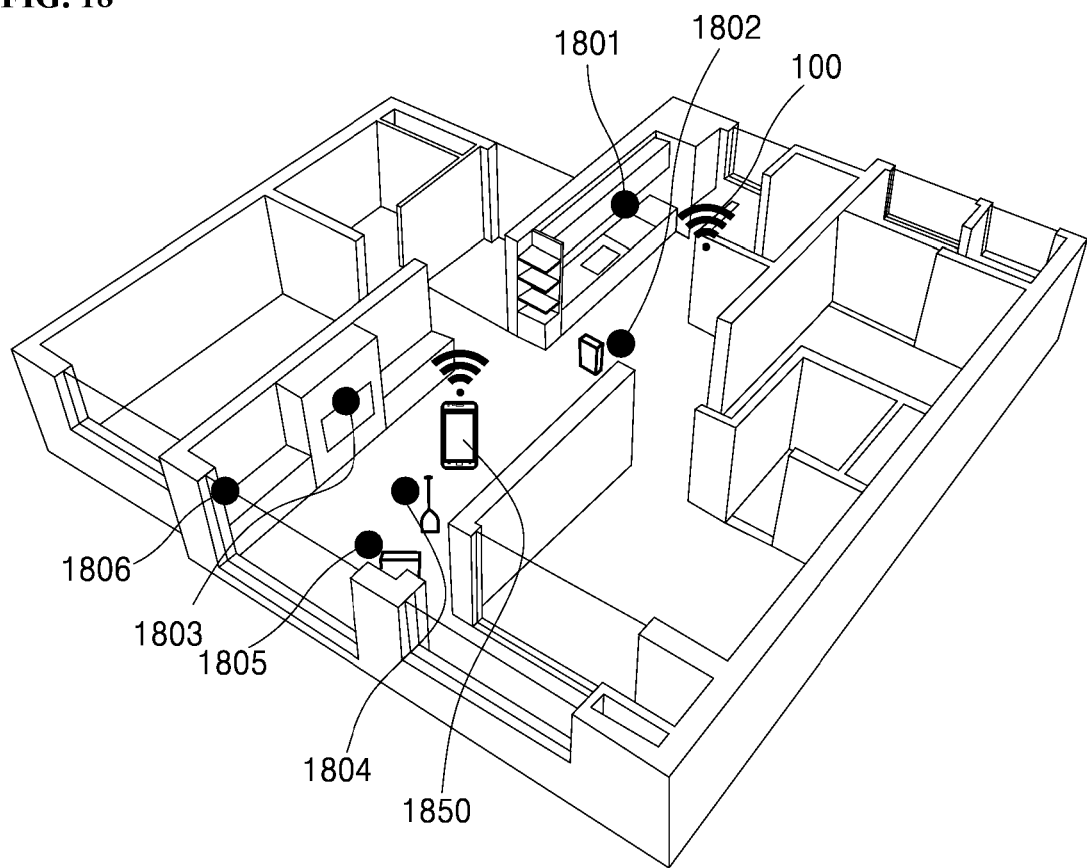
FIG. 18 is a view showing a smart home controller refrigerator according to an embodiment of this application and an implementation state thereof.

FIG. 18 is a view showing a smart home controller refrigerator according to an exemplary embodiment of this application and its implementation state. Through a control of a refrigerator 100 and a smart phone 1850 which is an embodiment of a portable device, a hood 1801, an air purifier 1802, a TV 1803, a lamp 1804, an air conditioner 1805, and a curtain control device 1806, etc., may be controlled. The curtain control device 1806 may be a control device that moves the curtain, for example, unfolding a curtain, and it is possible to move the curtain through the control of the refrigerator 100 and the smart phone 1850 such as the home appliance.

According to an exemplary embodiment of this application, in an infrared LED (light emitting) arranged to utilize a button of the refrigerator and a light receiving unit (photo transistor/photo diode) response thereto, it is possible to control a home appliance in home by using the infrared LED used as a light emitting unit and by using it as a signal for a remote control other than a button.

In particular, when a portable device such as a smart phone or a tablet generates and transmits a control value (ON/OFF/volume up/channel up, etc.) of a product to be controlled by an external server as control information, the refrigerator according to an exemplary embodiment of this application may receive the control information included with the control value from the external server via a Wi-Fi and may emit a light for an operation signal corresponding to the control information with the infrared LED to control a home appliance.

In addition, it may arrange an RF antenna corresponding to a remote control in an RF band other than the infrared signal in the above-mentioned operation protocol communication unit 330 and signal transmitting unit to control all products capable of controlling by RF (Zigbee, Bluetooth, UWB, etc.).

FIGS. 7, 8 and 12, or the elements that form the control unit 300 of the refrigerator may be stored in a computer program implementing the equivalent function or method and a recording medium that records it, and these are also interpreted to be included in a scope of this application.

Furthermore, even though all the components that is included in the embodiment of this application are described as being coupled to one or operate by being coupled, this application is not necessarily limited to such an embodiment, and all the components may operate by being selectively coupled to one or more thereof in the object range of this application. Further, although all of the components may be implemented as an independent hardware, respectively, some or all of each of the components may be selectively combined to be implemented as a computer program that has a program module that performs some or all of the function combined in one or a plurality of hardwares. The codes and the code segments that form the computer program will be easily deduced by those skilled in the art of this application. Such a computer program can be stored in a Computer Readable Media that a computer can read, and can be read and implemented by the computer to implement the embodiment of this application. As the storage medium of the computer program, it may include a storage media including a semiconductor recording element, an optical recording media, and a magnetic recording media. Further, a computer program that implements the embodiment of this application may include a program module that is transmitted in real time via an external device.

Although the embodiment of this application is mainly described hereinabove, various changes and modifications can be made within the level of those skilled in the art. Thus, unless such changes and modifications do not deviate the scope of this application, it will be understood that they are included in the scope of this application.

| Description of Reference Numerals | |
|---|---|
| 100: Refrigerator | 110: Interface unit |
| 115: Touch unit | 220: External server |
| 250: Portable device | 300: Control unit |
| 310: Storage unit | 320: Control protocol communication unit |
| 330: Operation protocol communication unit | |
| 441~446: Infrared light emitting unit | |
| 1001, 1101: Application interface of the portable device | |
| 1441: Infrared light receiving unit | |

The invention claimed is:

1. A smart home controller of a refrigerator, wherein the refrigerator comprises a storage space provided in the refrigerator and a door configured to open and close the storage space, comprising:
a control interface provided on the door and having a controller configured to control a home appliance at home, the controller including:
a control protocol communication unit configured to receive control information from an external server or a portable device to control the home appliance;
a storage unit configured to store the control information;
an operation protocol communication unit configured to generate an operation signal based on the control information; and
a signal transmitting unit configured to transmit the operation signal to the home appliance,
wherein the signal transmitting unit includes a plurality of infrared light emitters positioned to emit the infrared signal in a different direction from each other on the door.

2. The smart home controller of a refrigerator of claim 1, wherein the control information includes information to turn the home appliance on or off, to set a schedule to turn the home appliance on or off based on the schedule, or to control an operation of the home appliance.

3. The smart home controller of a refrigerator of claim 1, wherein the operation protocol communication unit is configured to communicate based an operation protocol including any one or more of Infrared communication, Zigbee communication, Bluetooth, or UWB (Ultra WideBand), and
wherein the signal transmitting unit that transmits the operation signal corresponding to the operation protocol to the home appliance is arranged on the door.

4. The smart home controller of a refrigerator of claim 3, wherein the control interface is configured to receive inputs to control an operation of the refrigerator,
wherein the signal transmitting unit is configured to sense a touch on the control interface, and
wherein the infrared light emitter transmits an infrared signal for controlling the home appliance according to the operating protocol.

5. The smart home controller of a refrigerator of claim 4, when the infrared light emitter transmits the infrared signal according to the operation protocol, the controller controls the infrared light receiver to not sense or process the infrared signal.

6. The smart home controller of a refrigerator of claim 3, wherein the control interface includes a Bluetooth communication interface, and
wherein the Bluetooth communication interface transmits the operation signal to the home appliance by pairing with the home appliance.

7. The smart home controller of a refrigerator of claim 1, wherein the control protocol communication unit transmits control result information to the external server or the portable device, the control result information including a result of a generation and a transmission of the operation signal.

8. The smart home controller of a refrigerator of claim 1, wherein the control information includes schedule information, and
wherein the controller controls the operation protocol communication unit and the signal transmitting unit such that the operation signal is transmitted to the home appliance at a time set in the schedule information.

9. The smart home controller of a refrigerator of claim 1, wherein the home appliance is a smart home device configured for wireless control.

10. The smart home controller of a refrigerator of claim 1, wherein the home appliance is at least one of a cook top hood, air purifier, a television, a lamp, an air conditioner, or a motorized window covering.

11. The smart home controller of a refrigerator of claim 1, wherein the controller is configured to communicate with the external server or the portable device over a first protocol and communicate with the home appliance over a second protocol different than the first protocol.

12. The smart home controller of a refrigerator of claim 11, wherein the external server and the portable device are connected to the controller of the refrigerator over Wi-Fi and the home appliance is configured to communicate with the controller of the refrigerator over at least one of infrared signal, Zigbee, Bluetooth, or Ultra WideBand (UWB).

13. The smart home controller of a refrigerator of claim 1, wherein the control information includes at least one of a serial number of the home appliance, a time, a communication protocol of the home appliance, an identifier name of the home appliance, a control function, or a duration.

14. The smart home controller of the refrigerator of claim 1, wherein the home appliance is controlled by the transmitted operation signal from the signal transmitting unit as same manner as being generated in the remote control of the corresponding home appliance.

15. A method for controlling a smart home controller refrigerator, comprising:
transmitting, from a portable device to a controller in a refrigerator or an external server, control information to control a home appliance provided external to the refrigerator, the control information being transmitted in accordance with a first protocol; and
receiving, by the portable device from the controller of the refrigerator or the external server, control result information corresponding to the control information indicating a result of an operation signal transferred to control the home appliance based on the control information, and
wherein the control information includes information to turn the home appliance on or off, to set a schedule to turn the home appliance on or off based on the schedule, or to control an operation of the home appliance, and
wherein the operation signal is a signal transmitted from the controller of the refrigerator to the home appliance to control the home appliance based on the control information, the operation signal being generated according to a second protocol that is different than the first protocol.

16. The method for controlling the smart home controller refrigerator of claim 15, wherein the second protocol comprises any one of Infrared communication, Zigbee communication, Bluetooth, or Ultra WideBand (UWB).

17. The method for controlling the smart home controller refrigerator of claim 15, wherein the receiving the control result information from the external server by the portable device includes receiving the control result information of the refrigerator stored in the external server in real time or at a predetermined time interval.

18. A method for controlling a smart home controller of a refrigerator which comprises a storage space to refrigerate or freeze contents and a door that opens or closes the storage space, the controller being provided on the door, comprising:
controlling, by the controller of the refrigerator, a control protocol communication unit to receive control information from an external server or a portable device to control a home appliance provided external to the refrigerator;
storing the received control information in a storage unit by the control unit;
controlling, by the controller of the refrigerator, an operation protocol communication unit to generate an operation signal based on the control information; and
transmitting, by a signal transmitting unit, the operation signal to the home appliance to control the home appliance according to the control information,
wherein the signal transmitting unit includes a plurality of infrared light emitters positioned to emit the infrared signal in a different direction from each other on the door.

19. The method for controlling the smart home controller of a refrigerator of claim 18, wherein the control information includes information to turn the home appliance on or off, to set a schedule to turn the home appliance on or off based on the schedule, or to control an operation of the home appliance.

20. The method for controlling the smart home controller of a refrigerator of claim 18, further comprising:
controlling the control protocol communication unit to transmit, to the external server or the portable device, control result information that includes a result of a generation and a transmission of the operation signal to the home appliance.

* * * * *